(12) United States Patent
Timur

(10) Patent No.: US 9,644,366 B2
(45) Date of Patent: May 9, 2017

(54) METHOD AND SYSTEM FOR URBAN ROOM STRUCTURES

(71) Applicant: Erden Timur, Istanbul (TR)

(72) Inventor: Erden Timur, Istanbul (TR)

(73) Assignee: Erden Timur, Istanbul (TR)

(*) Notice: Subject to any disclaimer, the term of this patent is extended or adjusted under 35 U.S.C. 154(b) by 0 days.

(21) Appl. No.: 14/856,866

(22) Filed: Sep. 17, 2015

(65) Prior Publication Data

US 2016/0145853 A1    May 26, 2016

Related U.S. Application Data

(63) Continuation of application No. 14/750,632, filed on Jun. 25, 2015.

(60) Provisional application No. 62/085,104, filed on Nov. 26, 2014.

(51) Int. Cl.
| | |
|---|---|
| *E04B 1/348* | (2006.01) |
| *E04H 1/00* | (2006.01) |
| *G06Q 20/14* | (2012.01) |
| *G06Q 10/02* | (2012.01) |
| *G06Q 20/40* | (2012.01) |
| *G06F 17/50* | (2006.01) |

(52) U.S. Cl.
CPC ...... *E04B 1/34861* (2013.01); *E04B 1/34807* (2013.01); *E04H 1/005* (2013.01); *G06F 17/5004* (2013.01); *G06Q 10/02* (2013.01); *G06Q 20/145* (2013.01); *G06Q 20/405* (2013.01)

(58) Field of Classification Search
CPC .................................................. E04B 1/34861
See application file for complete search history.

(56) References Cited

U.S. PATENT DOCUMENTS

| 5,614,703 A * | 3/1997 | Martin ............... G07C 9/00103 |
| | | 235/375 |
| 2002/0065635 A1* | 5/2002 | Lei .......................... G06T 19/00 |
| | | 703/1 |
| 2003/0149576 A1* | 8/2003 | Sunyich ................. G06Q 30/02 |
| | | 705/5 |

(Continued)

FOREIGN PATENT DOCUMENTS

DE    3229902 A1 *  2/1984  ............... E04H 1/00

OTHER PUBLICATIONS

Kosseff, Jeffrey, "Steelcase, Jersey Developer Form Biz to Offer One-Stop Office, Furniture Design," Crain's Detroit Business, 17.20: 14, Crain Communications, Inc. (May 14, 2001).*

(Continued)

*Primary Examiner* — Nathan Erb
(74) *Attorney, Agent, or Firm* — Perkins Coie LLP

(57) ABSTRACT

Some embodiments include a structural building that supports attachment of modular rooms. The structural building can include one or more anchoring structures fixated to its building frame. A moveable modular room can be adapted to be detachably connectable to at least one of the anchoring structures. The modular room can be adapted with fixture features for a customized application to use the modular room. The anchoring structures can be adapted to enable replacement of the moveable modular room, as a single unit, by another moveable modular room. The moveable modular room can be a configurable room.

21 Claims, 58 Drawing Sheets

(56) References Cited

U.S. PATENT DOCUMENTS

| | | | |
|---|---|---|---|
| 2005/0197877 A1* | 9/2005 | Kalinoski | G06Q 10/06 |
| | | | 705/7.19 |
| 2005/0279035 A1* | 12/2005 | Donovan | E04B 1/348 |
| | | | 52/79.1 |
| 2011/0186154 A1* | 8/2011 | Klicpera | B67D 7/08 |
| | | | 137/551 |
| 2012/0291383 A1* | 11/2012 | Zohar | E04B 2/06 |
| | | | 52/309.1 |
| 2013/0055324 A1* | 2/2013 | Ostlund | H04N 21/2543 |
| | | | 725/83 |
| 2013/0259308 A1* | 10/2013 | Klusza | G06K 9/00624 |
| | | | 382/103 |
| 2016/0031090 A1* | 2/2016 | Larrea-Tamayo | E04B 1/3483 |
| | | | 715/702 |

OTHER PUBLICATIONS

Larson, Mark, "Custom Homes Get High-End Treatment From Front to Backyard: Even Apartments Are Built With Top Tech, Energy Amenities," San Diego Business Journal, 31.36: 16(2), CBJ, L.P. (Sep. 6, 2010).*

U.S. Appl. No. 14/750,632 by Timur, E., filed Jun. 25, 2015.

* cited by examiner

METHOD AND SYSTEM FOR URBAN ROOM STRUCTURES

CROSS-REFERENCE TO RELATED APPLICATION(S)

This application is a continuation of U.S. patent application Ser. No. 14/750,632, entitled "METHOD AND SYSTEM FOR URBAN ROOM STRUCTURES, filed on Jun. 25, 2015, which claims the benefit of U.S. Provisional Patent Application No. 62/085,104, entitled "METHOD AND SYSTEM FOR URBAN ROOM STRUCTURES," which was filed on Nov. 26, 2014, both of which are incorporated by reference herein in their entirety.

RELATED FIELD

Some embodiments relate to civil engineering structures, and more specifically to urban building structures.

BACKGROUND

A constant challenge of urban building design is the limited amount space to contain a large number of people. Office and residential buildings optimize for a larger living space by adapting to architectural design that reduces wasted space, such as condominium, apartment, cubicle, and row offices. However, these conventional urban architectural designs lack adaptability. Because of the necessity to make each room similarly spaced, it is difficult to furnish each room with its own furniture and appliances that differentiate the rooms from one another.

Yet another challenge of the urban building design is the lack of space to lay out a construction site. Most urban construction sites are surrounded by many existing buildings. Because of the limitation on the size of a construction site, it is often difficult to build complicated building structures in an urban environment.

DISCLOSURE OVERVIEW

Embodiments include a variety of methods and systems for improving the creation and customization of modular building structures (e.g., a prefabricated modular room, prefabricated stairs, or other building-level structures) and room customization modules (e.g., modular attachments of furniture, appliances, tools, and emulated fixture). In this disclosure, a "room" refers to a variety of building structures, including both enclosed and non-enclosed building structures, such as patios and terraces. Various embodiments are described herein that improve the effectiveness and efficiency of urban building construction for user comfort and utility. For example, some embodiments include buildings that have multiple prefabricated sections such that there is no need for a large construction site to make the building structures in real-time. Each prefabricated section can be adapted as a prefabricated modular room that can be conveniently inserted and attached into a building frame. In some embodiments, the building frame is adapted such that, at a later time, the modular room can be conveniently extracted and replaced with another modular room. This building architecture enables a dynamic configuration of buildings in an urban environment.

In some embodiments, the modular rooms can be six-sided self-contained units. The modular rooms can be constructed remotely and delivered to a site where they are to be used (e.g., installed). A plurality of modular rooms can be joined together to make a single functional building. Moreover, the modular rooms can be joined in a number of ways, including side-by-side, end-to-end, on top of one another, etc. The various combinations allow for a variety of configurations and styles in building layout.

In various embodiments, a modular room is adapted to be detachably connected to an anchoring structure. For example, the anchoring structure may have one or more customized mechanical connectors, a guide rail system, etc. that allow a modular room to be installed or uninstalled in a short amount of time. Detachable connectability may be implemented by a plurality of structural interfaces that are adapted to easily and/or quickly connect (e.g., fastened together, installed) or disconnect. A modular room can be associated with a customized application. A customized application includes a predetermined use for the modular room. For example, a modular room may have a television and sound system for an entertainment application; a treadmill for a gym application; and a workstation for a business/home office application; etc. The anchoring structure can be adapted to accept a single modular room customized for a single application, a plurality of modular rooms customized for different applications, or a single modular room that can be re-configured for multiple applications (e.g., a "configurable common room"). The anchoring structure can be adapted to accept a first moveable modular room. In some embodiments, a second moveable modular room can be installed in addition to the first moveable room. In some embodiments, a second moveable modular room can be installed to replace the first moveable room. The second moveable modular room can be adapted to a different application than the first moveable modular room. In some embodiments, both the first and second moveable modular rooms are configurable commons rooms.

For example, when a person determines a new preference for a modular building, an external tool (e.g., a crane) can extract the first moveable modular room from the anchoring structure. For example, a release mechanism can detach (e.g., un-anchor) the first moveable room from the building frame. The anchoring structure can then accept a second moveable modular room that is associated with a second customized application. For example, the external tool can insert the second moveable modular room into the building frame onto the anchoring structure.

Some embodiments include a method of customizing a configurable common room. The method may be facilitated by a computing machine. The computing machine can provide, to a user, a plurality of modular room choices. In some embodiments, the computing machine can show (e.g., present via a display) the user how to configure the common room utilizing room customization modules of the common room. In some embodiments, the computing machine can configure the common room utilizing mechanical actuators and electronics controlled by the computing machine. Each modular room choice can represent a customized room usage application.

In some embodiments, the computing machine can control mechanical actuators that move or orient the room customization modules and electronics that interface with and configures the room customization modules. In those embodiments, upon receiving a first selection from the user of a first room usage application, the computing machine can mechanically move or configure the room customization modules to satisfy that room usage application. The computing machine can also configure the smart appliances and electronics in the common room.

In various embodiments, a method and system of customizing includes creating a plurality of room customization modules, wherein each room customization module represents a customized application. A room customization module can be a tool (e.g., a projector, a computer, etc.), an appliance (e.g., refrigerator, air conditioner, etc.), furniture (e.g., sofa, pool table, desk, table, bed, etc.), a configurable fixture (e.g., light, fan, etc.). At least some of the room customization modules can be installed and replaced conveniently utilizing one or more quick release and anchor mechanisms. At least some of the room customization modules can fold into themselves or other room customization modules to save space. The plurality of room customization modules can be adapted to be receivable by one or more predefined spaces in a configurable common room. The room customization modules can be detachably connectable with the one or more predefined spaces. The room customization modules can be adapted to enable a user to replace a first room customization module with a second room customization module via a mechanical release mechanism. The first room customization module can be adapted to transform into the second room customization module via a mechanical structure that folds, re-aligns, re-orients, re-positions, resizes, or otherwise reconfigures at least a portion of the first room customization module. The second room customization module may vary from the first room customization module in various ways (e.g., represent a different customized application, be a different size).

In various embodiments, a resource management reservation system (e.g., the computing machine) and method of using said system may be used to authorize access and/or charge the user(s) a fee. Using the system, an authorized user may (1) make a reservation to use a common room at a certain location (e.g., anchoring structure), specifying the date and time for the usage; (2) at the appropriate time, access the common room and/or present identification to automatically gain access to the common room; (3) check out of the common room or reach a predetermined end time; (4) receive a bill and/or be charged the fee in the bill automatically; or any combination thereof. The fee may be based on the utility resources (e.g., electricity, water, gas, Internet connection, etc.) consumed during a stay. The fee may be based on the types of customized applications used in a configurable common room.

The feature of enabling installation of modular rooms into a building frame via the anchoring structures may be characterized as "external mobilization" of modular rooms. The external mobilization feature is advantageous to enable dynamic modification of an architectural building even after it is built. The external mobilization feature also enables a quick turnaround to build a large urban building within a small construction space.

In a modular building, there can be one or more configurable rooms and one or more unconfigurable rooms. In some embodiments, at least a configurable common room can be surrounded by two or more unconfigurable rooms (e.g., bedrooms or work offices). This layout enables the modular building to save the cost of building multiple application-specific rooms and utilize one common room for multiple room usage applications. That is, one comfortable common room can be configured as a theater, a conference room, a gym, a kitchen, a shower, a dance floor, a workshop, or any combination thereof.

The feature of enabling installation of room customization modules into a modular building may be characterized as "internal mobilization" of modular rooms. At least some of the room customization modules can be detachably coupled to a structural frame of a modular room. At least some of the room customization modules have space-saving capabilities by having structures that enable the room customization modules to fold into themselves, the structural frame, or other room customization modules. The internal mobilization feature is advantageous to enable the concept of a configurable common room described above.

In some embodiments, a computer implemented method of securitizing a configurable common room is described. A computing machine can authenticate users to access the configurable common room. The computing machine can facilitate reservations of the configurable common room. The computing machine can facilitate charging a fee to a user that uses the configurable common room. In some embodiments, the computing machine can illustrate to the user how to configure the configurable common room. In some embodiments, the computing machine can actuate or move (e.g., via robotics) at least some of the room customization modules to adapt the configurable common room to a desired room usage application.

In several embodiments, the purpose of the disclosed system is to enable people to enjoy the functions of a large building (e.g., house/office), while only being permanently allocated a small area within the building. For example, everyone can have the functions of, for example, a 5000 m2 house/office. The individuals within the building, having the functions of a 5000 m2 house/office, can only use 100 $m^2$ of this area permanently. The rest of the area in the building will be vacant, in general, as those areas can only be used in intervals. In this system, the owner purchases an area for permanent use and rents the remaining areas at a specific price for using in certain intervals. That way, the individual can have a more social and luxurious life.

The Overview is provided to introduce a selection of embodiments in a simplified form that are further described below in the Detailed Disclosure. Some embodiments have other aspects, elements, features, and steps in addition to or in place of what is described above. These potential additions and replacements are described throughout the rest of the specification. Other advantages and features will become apparent when viewed in light of the Detailed Description when taken in conjunction with the attached drawings and claims

BRIEF DESCRIPTION OF THE DRAWINGS

These and other objects, features and characteristics will become more apparent to those skilled in the art from a study of the following detailed description in conjunction with the appended claims and drawings, all of which form a part of this specification. In the drawings:

Figure 1:
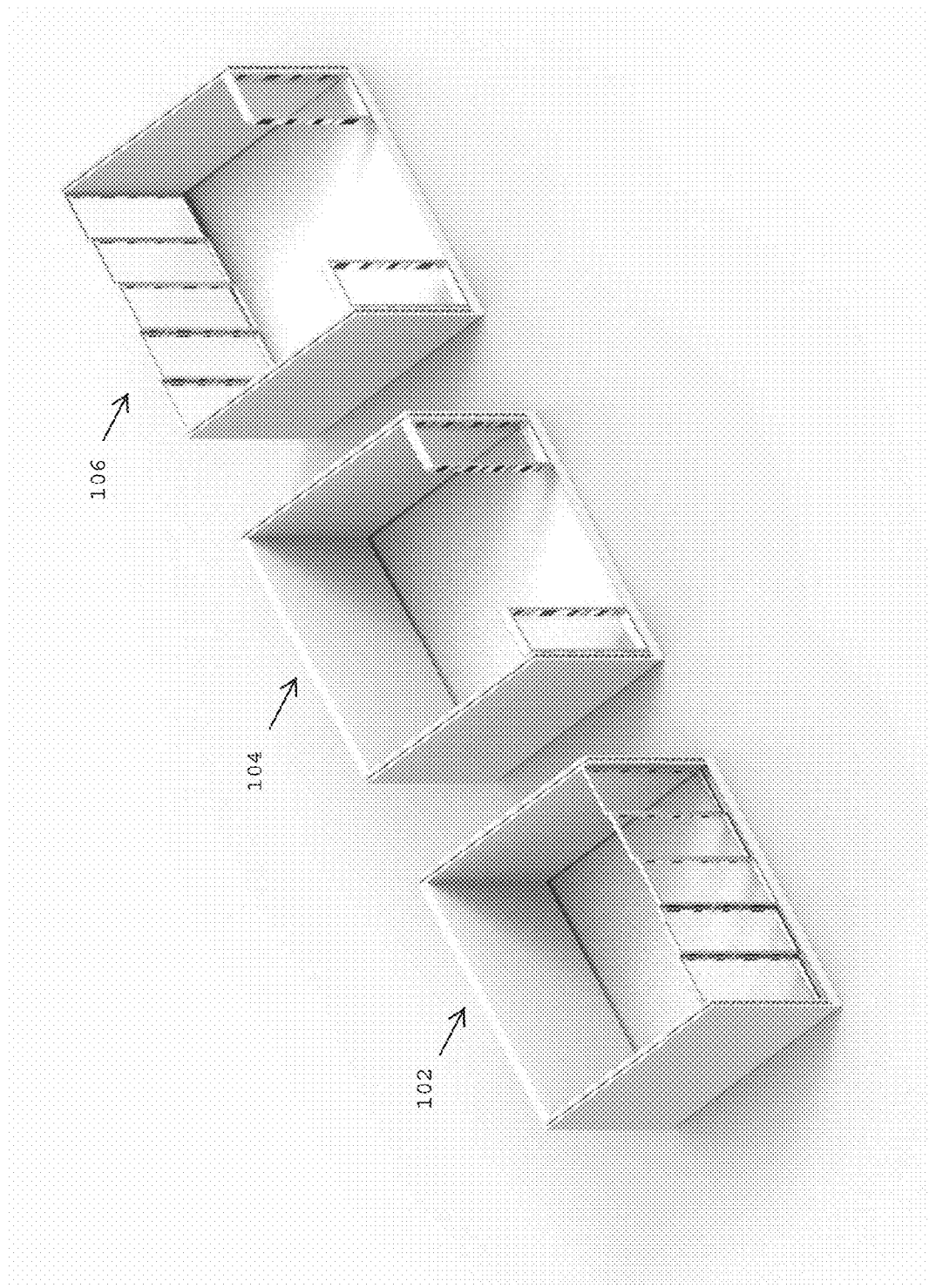
FIG. 1 is a pictorial diagram of various modular room structures, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

References will be made below in the Detailed Description to various embodiments, which are illustrated in the accompanying drawings. The same or similar reference numerals have been used throughout the drawings to refer to the same or like parts. The accompanying figures are included to provide a further understanding of the various embodiments described herein. It will be understood by one skilled in the art that various features of the embodiments described within the Detailed Description and the figures can be used in any and all combinations.

FIG. 1 illustrates a pictorial diagram of various modular room structures (e.g., a modular room 102, a modular room 104, and a modular room 106). In various embodiments, the modular rooms can be designed with four structural walls. The structural walls can allow for access to another modular room, a non-modular (e.g., permanent) room, etc. The structural walls of the modular room can be designed for access on one side, a first and second opposite side, all sides, or any combination thereof. In some embodiments, the floor and ceiling of a first modular room may be configured to allow the user to move between a first modular room and a second modular room located above or below the first modular room. In most embodiments, the floor and ceiling of a modular room will be impassable.

Figure 2:
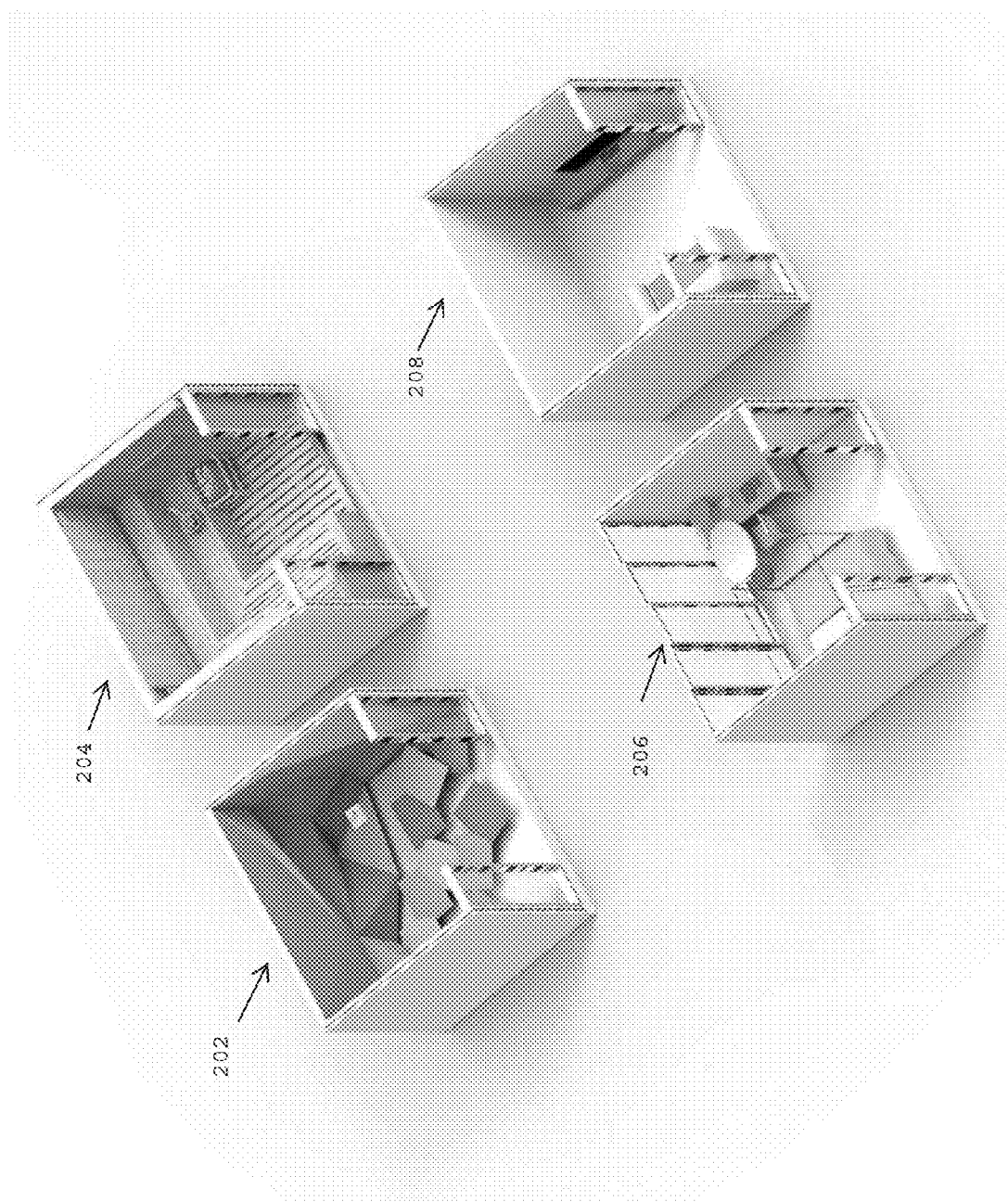
FIGS. 2-3 are pictorial illustrations of various modular room customizations, in accordance with various embodiments.
Figure 3:
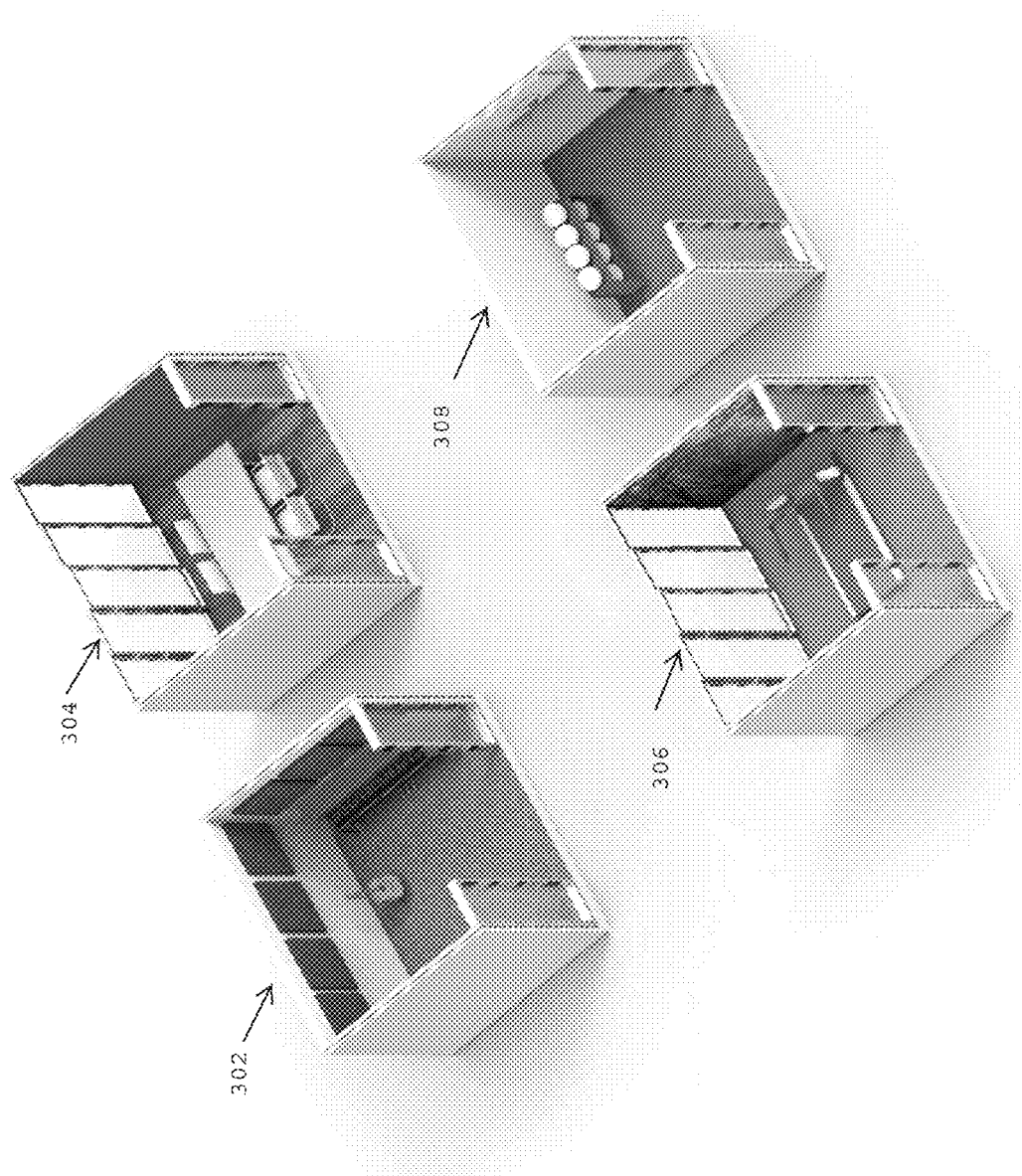

FIGS. 2-3 are pictorial illustrations of various modular room customizations, in accordance with various embodiments. The modular rooms can be designed, constructed, and/or customized for different applications (e.g., entertainment, sports, business). For example, FIG. 2 illustrates a modular room 202, a modular room 204, a modular room 206, and a modular room 208. For example, FIG. 3 shows a first modular room 302 customized as a music room, a second modular room 304 customized as a gathering space (e.g., dining table), and a third modular rooms 306 and a fourth modular room 308 customized as spaces for athletic activities.

Figure 4:
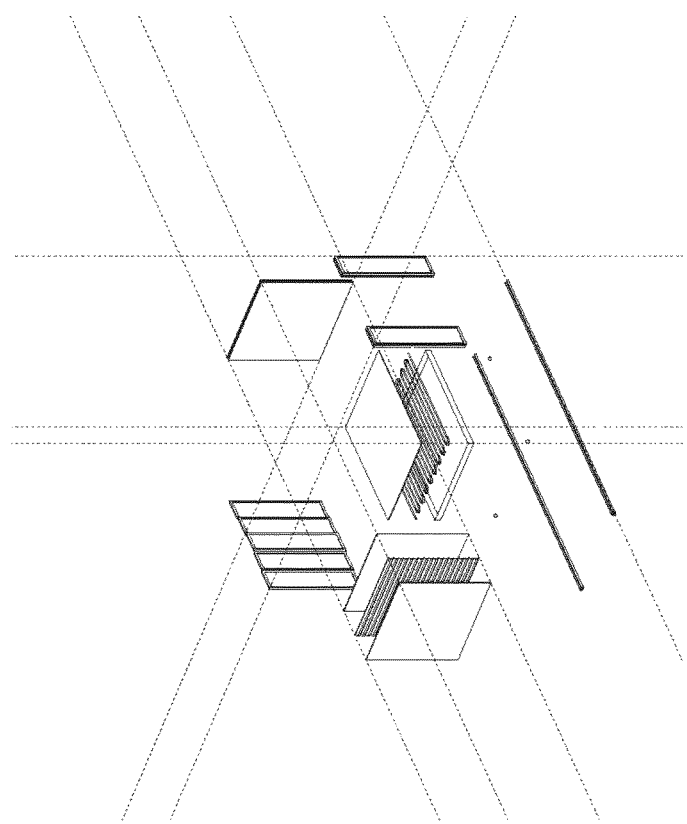
FIG. 4 is a schematic of a modular room, in accordance with various embodiments.

FIG. 4 is a schematic of a modular room. As described above, the modular room may be constructed in various ways. In various embodiments, the modular room may have combinations of doors and/or windows on each of the sides. In some embodiments, the modular room may have a door and/or windows on one, two, three, etc. sides, which may indicate how the modular room is to be installed. For example, if the modular room has a single set of sliding doors on a first side, the modular room may be designed such that a second side opposite the first side is to be installed in a particular manner.

Figure 5:
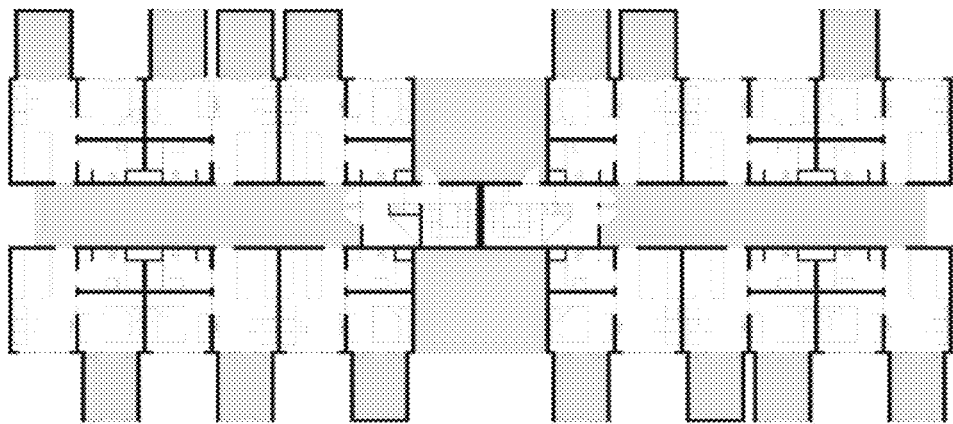
FIG. 5 is an example of a floor plan of a building that includes various modular rooms, in accordance with various embodiments.
Figure 5:
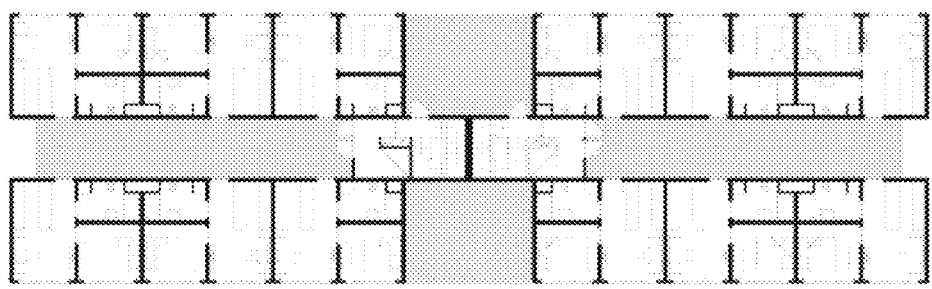
Figure 6:
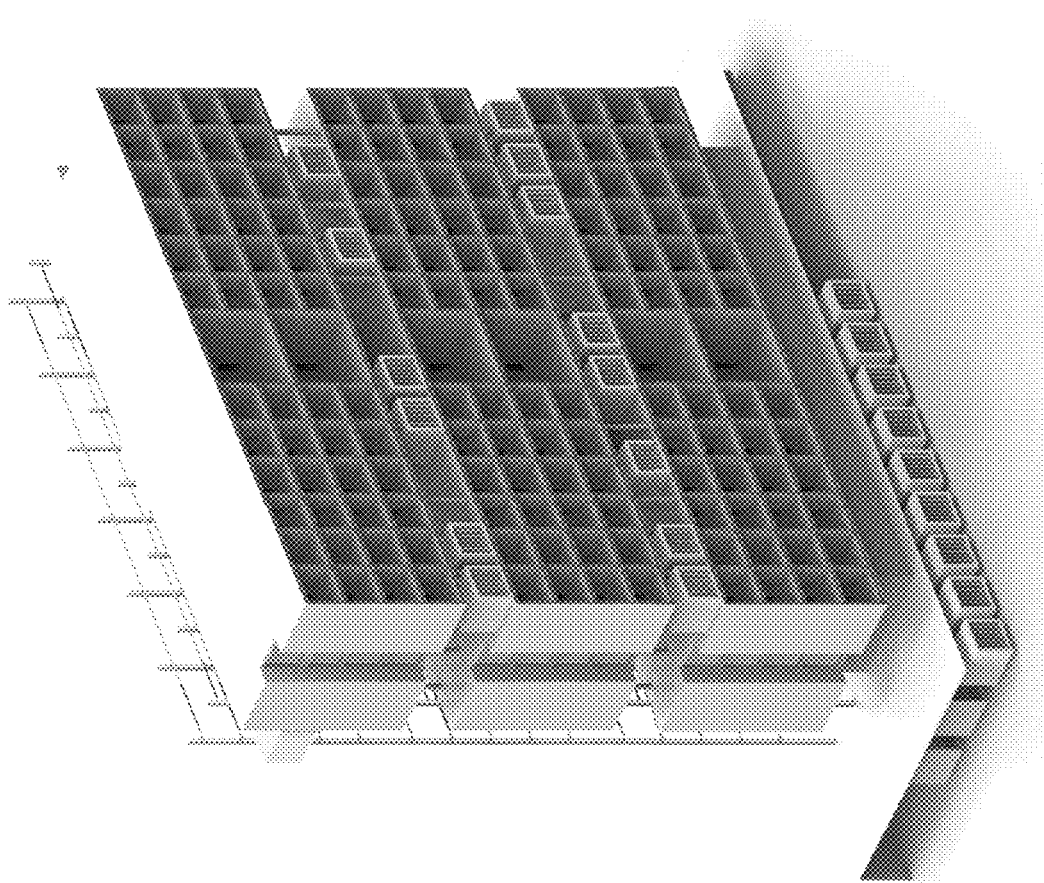
FIG. 6 is a three-dimensional diagram of a building with multiple floors, each for having multiple slots to insert modular rooms, in accordance with various embodiments.
Figure 7:
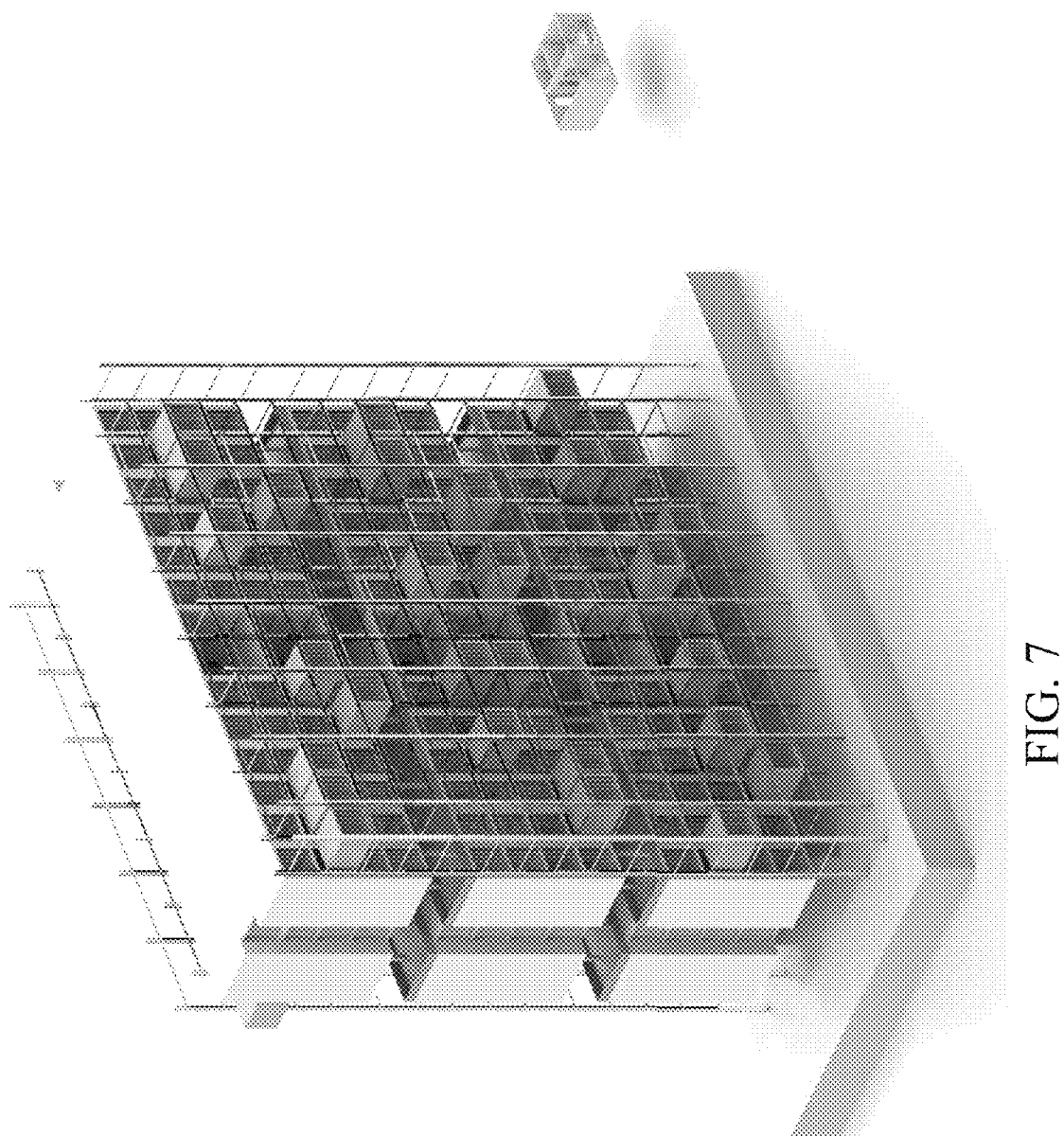
FIG. 7 is a three-dimensional diagram illustrating reconfiguration of modular rooms in a building, in accordance with various embodiments.
Figure 8:
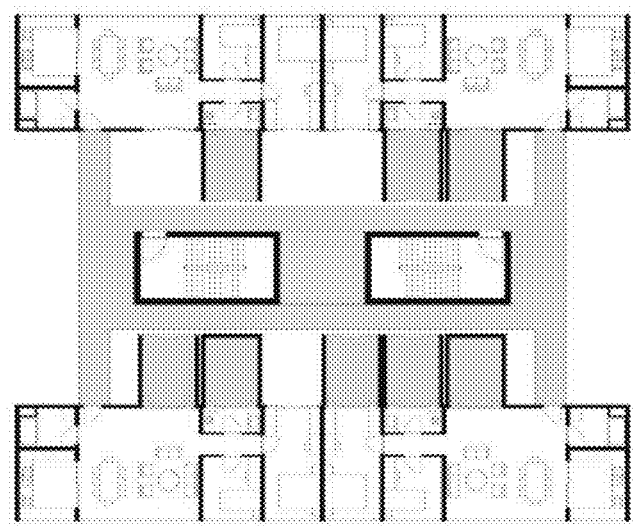
FIG. 8 is another example of a floor plan of a building that includes various modular rooms, in accordance with various embodiments.
Figure 8:
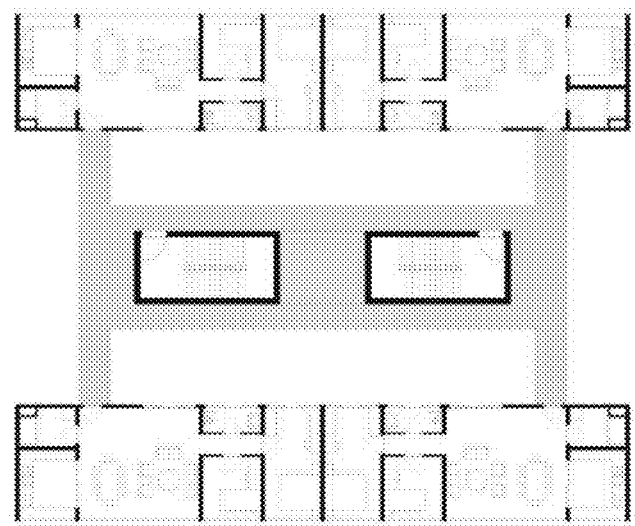
Figure 9:
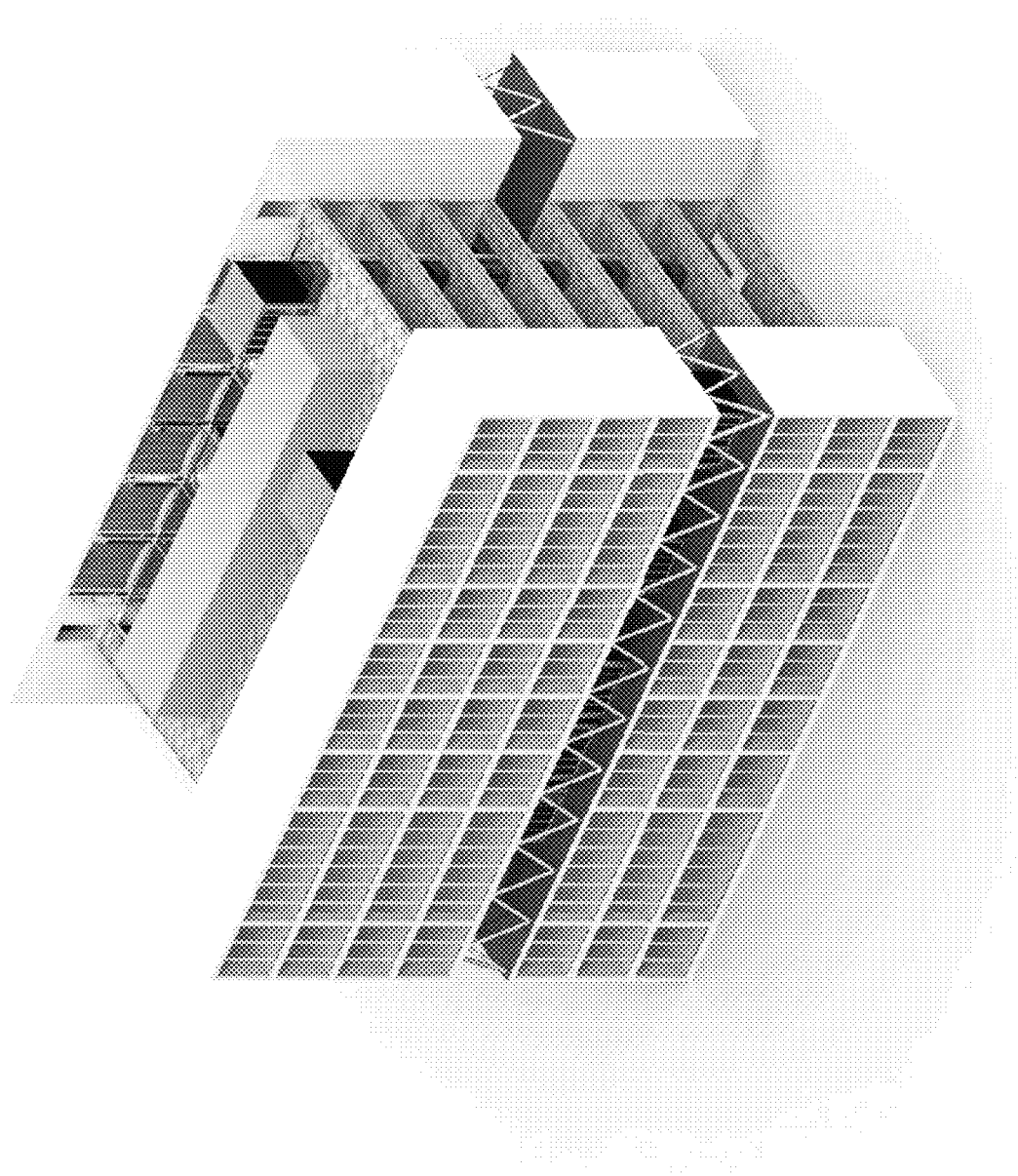
FIG. 9 is a three-dimensional diagram illustrating a building having multiple modular rooms of different sizes, in accordance with various embodiments.
Figure 10:
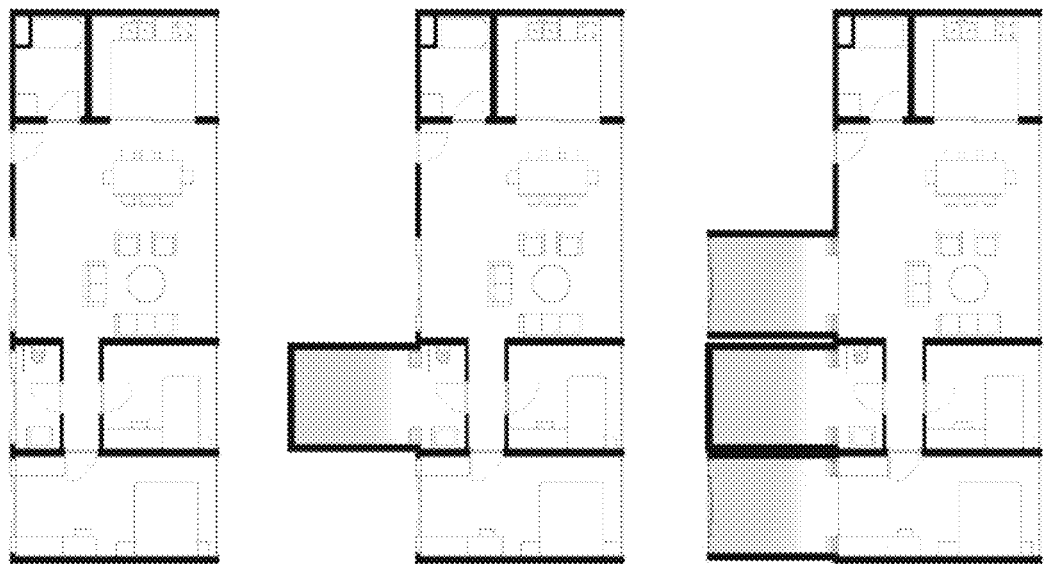
FIG. 10 is a floor plan diagram illustrating different modular rooms and different combinations of modular rooms, in accordance with various embodiments.
Figure 10:
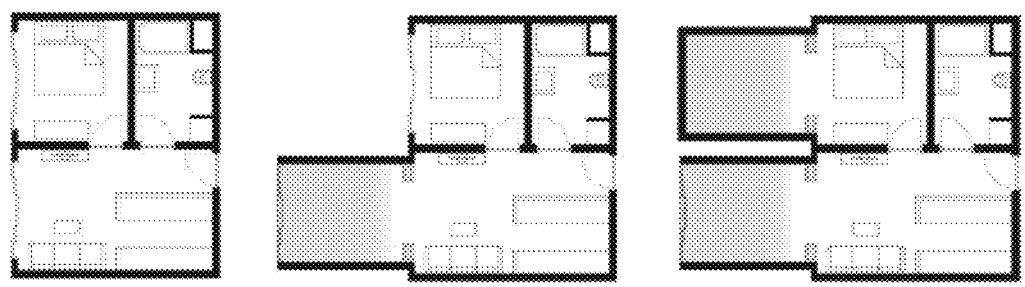

FIG. 5 is an example of a floor plan of a building that includes various modular rooms, in accordance with various embodiments. FIG. 6 is a three-dimensional diagram of a building with multiple floors, each for having multiple slots to insert modular rooms, in accordance with various embodiments. FIG. 7 is a three-dimensional diagram illustrating reconfiguration of modular rooms in a building, in accordance with various embodiments. FIG. 8 is another example of a floor plan of a building that includes various modular rooms, in accordance with various embodiments. FIG. 9 is a three-dimensional diagram illustrating a building having multiple modular rooms of different sizes, in accordance with various embodiments. FIG. 10 is a floor plan diagram illustrating different modular rooms and different combinations of modular rooms, in accordance with various embodiments.

In various embodiments, the modular rooms can be adapted to connect to an anchoring structure. The anchoring structure can be, for example, a permanent (e.g., concrete steel) shell or frame, a fully functioning building, etc. That is, in some embodiments the anchoring structure can be used without the modular rooms, while in other embodiments the anchoring structure provides no utility to a user prior to the installation of one or more modular rooms.

In various embodiments, the modular rooms (e.g., modular rooms of FIGS. 2-3) can be adapted to attach directly to one or more rooms of the anchoring structure. In such embodiments, the modular room can provide a user with additional space for working, living, etc. The modular rooms can be adapted to detachably connect with more than one type of room of the anchoring structure. For example, the modular rooms of FIG. 5B can be adapted to detachably connect to a bedroom, a living space, a bathroom, etc. In some embodiments, the modular rooms may be adapted to detachably connect to a limited subset of rooms. For example, a modular room (e.g., dining area) may be adapted to detachably connect to a living space, but not a bedroom or bathroom of the anchoring structure.

As shown in FIG. 6, the modular rooms can be installed and stored in various manners. In some embodiments, unused modular rooms may be stored locally (e.g., near or within the anchoring structure), while in other embodiments unused modular rooms may be stored remotely. Unused modular rooms that are stored locally may be easily selected by the user and quickly installed.

As shown in FIG. 7, the modular rooms may be supported by one or more support structures. The support structures, which may be separate from or part of the anchoring structure, serve to support the added force created by the modular room(s). In various embodiments, the support structure can be used to assist during installation of the modular room. The support structure may also allow for additional configurations of modular rooms that would otherwise be difficult to safety accomplish. For example, the support structure may allow a second modular room to detachably connect to a first modular room, which can detachably connect to the anchoring structure. The installation of a second modular room, which may not be connected to the anchoring structure, may not be possible without the use of a support structure.

As shown in FIGS. 8-9, the modular rooms may also be installed within the anchoring structure. Depending on the design of the anchoring structure, modular rooms may be connected to the outer side, connected to the inner side, installed within the existing anchoring structure, or any combination thereof. The design of the anchoring structure can allow for easy installation and uninstallation of modular rooms. In various embodiments, the design of the anchoring structure may be selected to allow one or more type of modular room to be easily installed and uninstalled.

As shown in FIG. 10, the modular rooms may be configured to detachably connect to all or a limited subset of rooms of the anchoring structure. For example, a modular room may be adapted to detachably connect only with a living space. In various embodiments, a single unit (e.g., apartment, office) of the anchoring structure may be adapted to connect to one or more modular rooms. For example, a first one-bedroom apartment may be configured to connect to a single modular room, while a second one-bedroom apartment may be configured to connect to a plurality of modular rooms. Similarly, a two- or three-bedroom apartment may be configured to connect to one, two, three, etc. modular rooms.

Figure 11:
FIG. 11 is a three-dimensional rendering of a building frame capable of accepting modular rooms, in accordance with various embodiments.
Figure 12:
FIG. 12 is a three-dimensional rendering of a modular room being attached to a building frame an anchor mechanism, in accordance with various embodiments.
Figure 13:
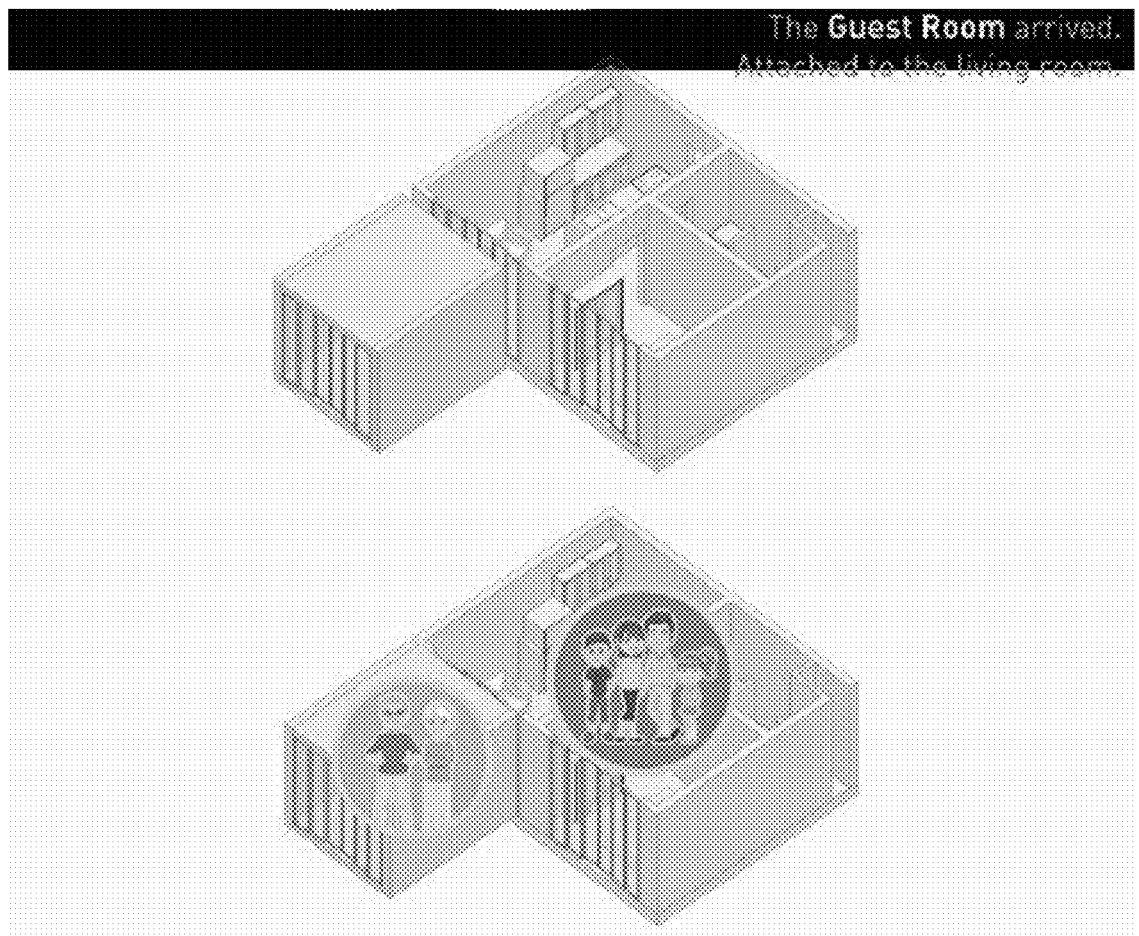
FIG. 13 is an illustration of how an additional modular room can be attached to an existing modular room to dynamically add a guest bedroom, in accordance with various embodiments.

FIG. 11 is a three-dimensional rendering of a building frame capable of accepting modular rooms, in accordance with various embodiments. FIG. 12 is a three-dimensional rendering of a modular room being attached to a building frame an anchor mechanism, in accordance with various embodiments. FIG. 13 is an illustration of how an additional modular room can be attached to an existing modular room to dynamically add a guest bedroom, in accordance with various embodiments.

In some embodiments, the modular rooms may be adapted to convey information to a user, an owner of the anchoring structure, etc. For example, the modular rooms may be color-coded according to their use (e.g., yellow for entertainment, blue for music, red for athletic activities). In some embodiments, the modular rooms may be color-coded according to their installation requirements. For example, a unit of the anchoring structure (e.g., apartment, office) may be configured to detachably connect only to certain modular rooms (e.g., only blue and yellow, but not red). In some embodiments, the color of the modular rooms may be controlled by a user, an owner of the anchoring structure, etc.

Figure 14A:
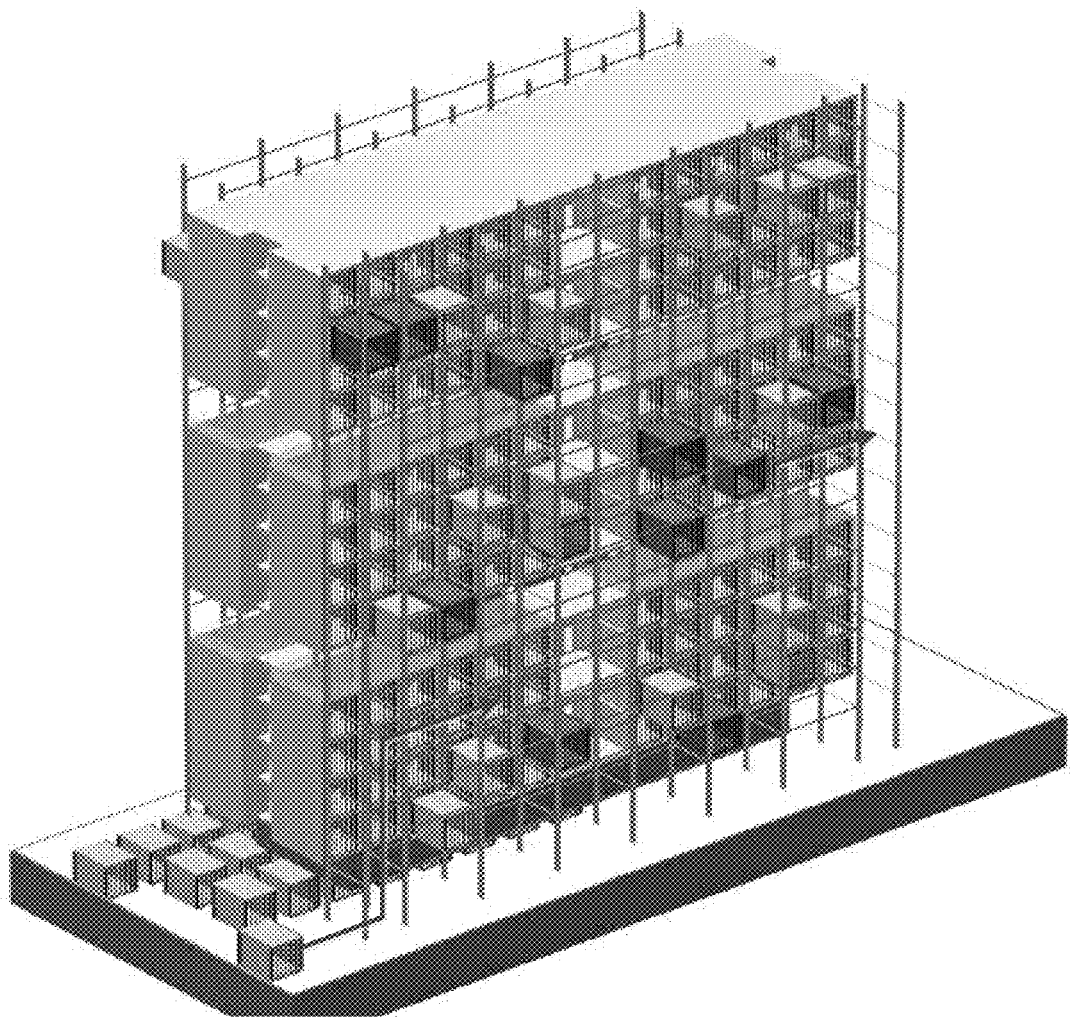
FIGS. 14A-C show an example installation process according to various embodiments.
Figure 14B:
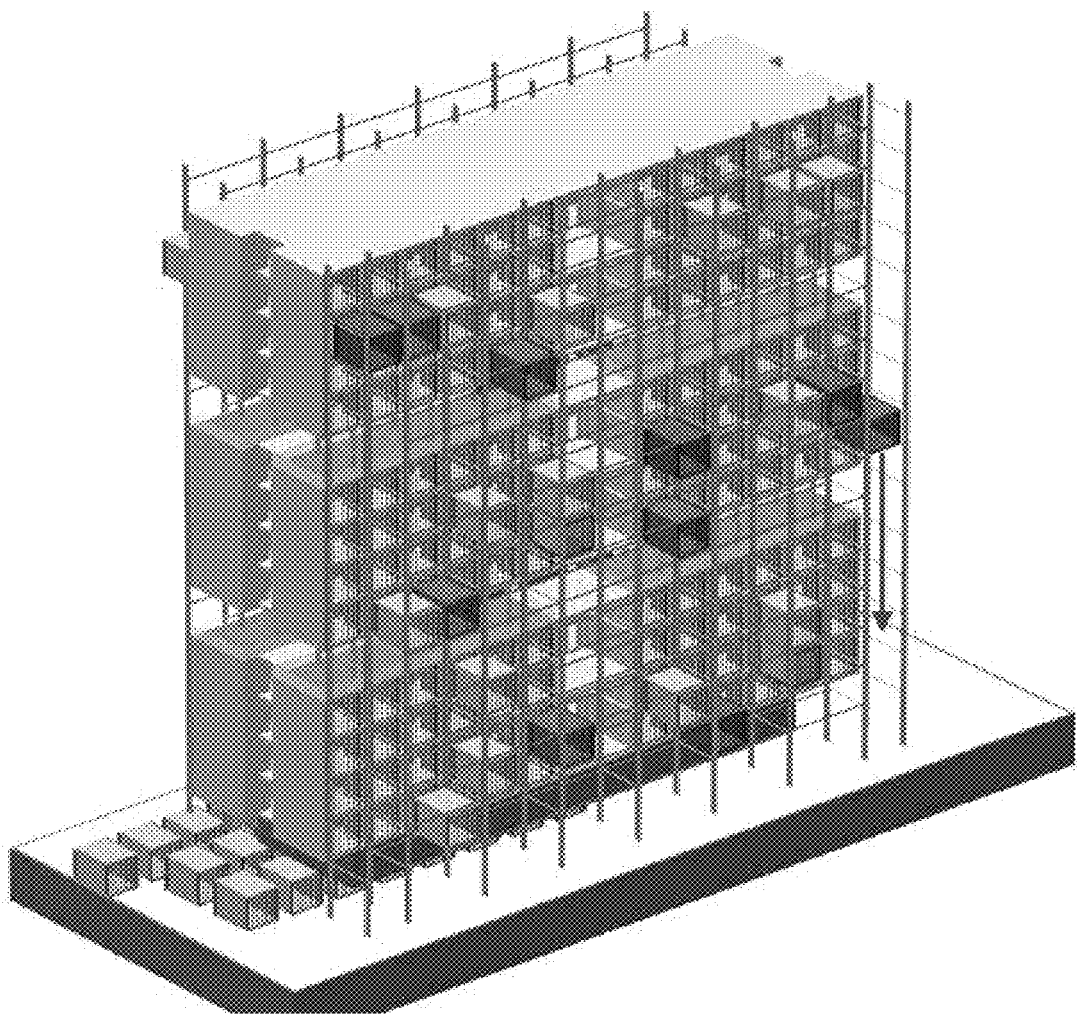
Figure 14C:
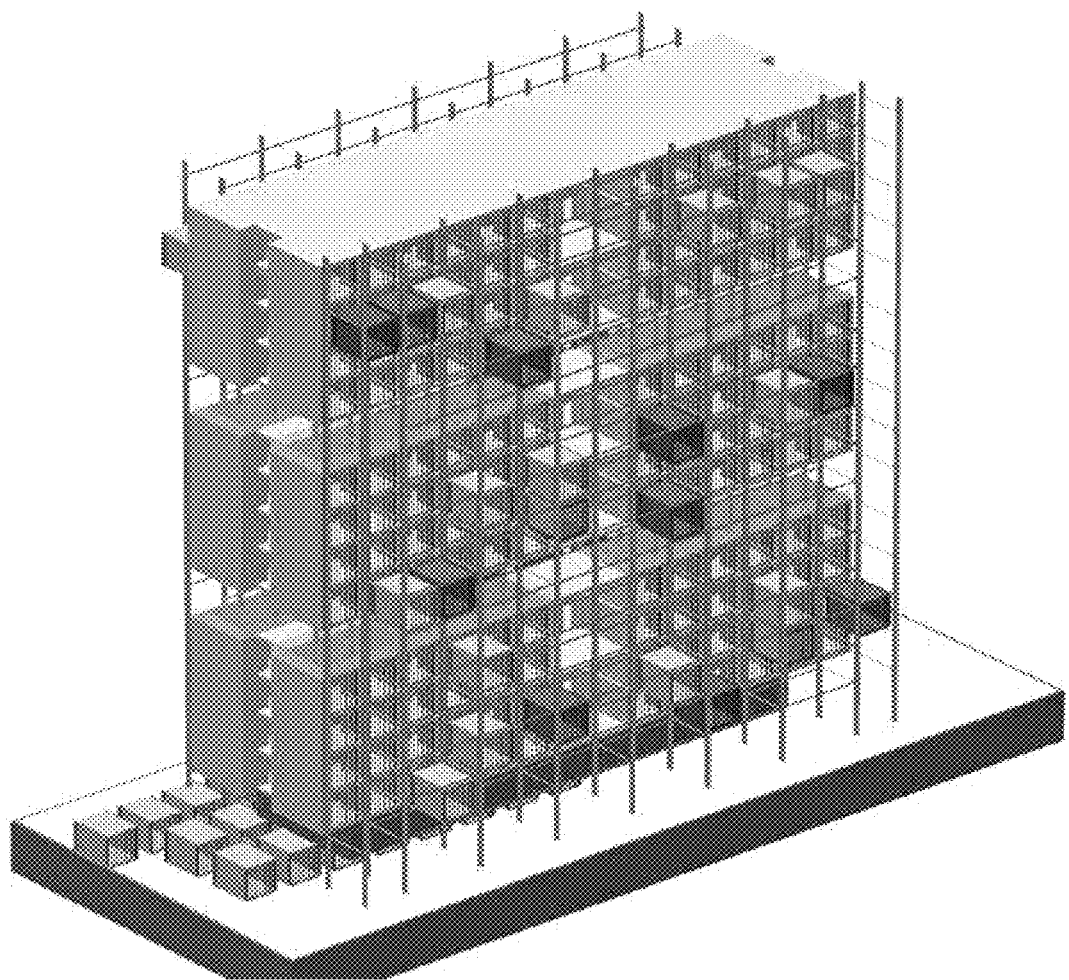

FIGS. 14A-C illustrate an example installation process according to various embodiments. The modular rooms can be installed in a variety of ways (e.g., crane, elevator, tracks). For example, FIGS. 14A-C show a yellow modular room moving from a local storage area to a new installed location of the anchoring structure, and a blue modular room moving from an installed location to the local storage area. In various embodiments, one or more modular rooms may be detachably connected and/or unconnected from the anchoring structure. The one or more modular rooms can be customized for different applications (e.g., entertainment, sports, business). By installing the one or more modular rooms, the unit of the anchoring structure can be modified. The one or more modular rooms can provide additional space, additional utility, etc. to the user of the unit. In various embodiments, the modular rooms can be installed and used (e.g., rented) by the user for a set daily, monthly, yearly, etc. fee. This method of installing modular rooms eliminates the expense and risk associated with adding new rooms, while continuing to provide users options to customize their unit. Moreover, this method of installing modular rooms provides customization options to those users who otherwise may not be able to customize (e.g., renters of apartments).

Figure 15A:
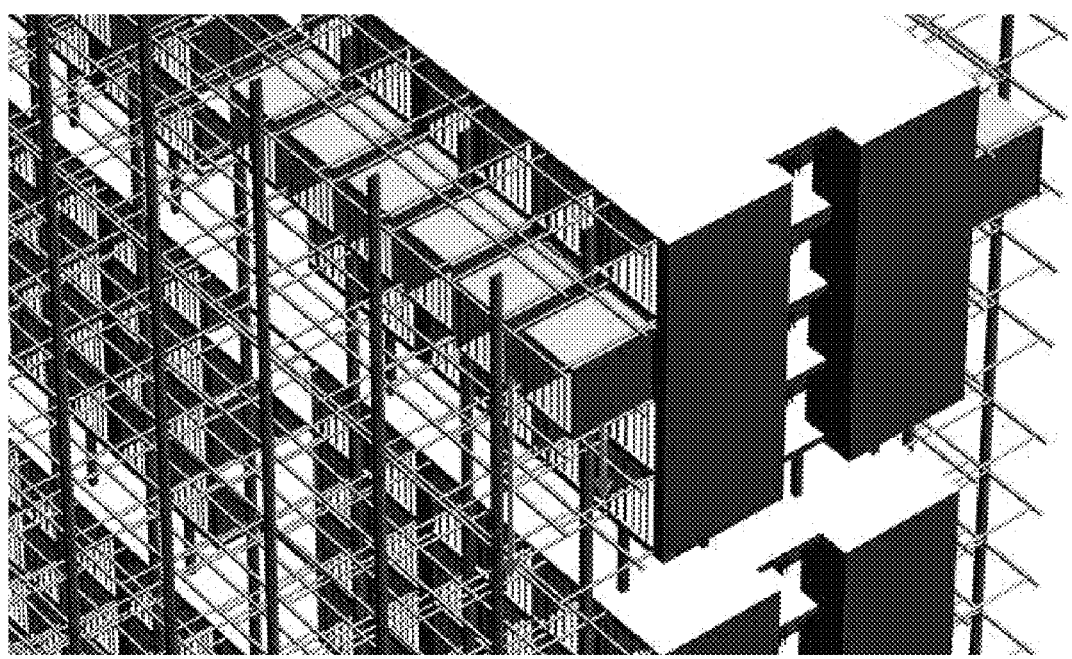
FIGS. 15A-C show an example installation process according to various embodiments.
Figure 15B:
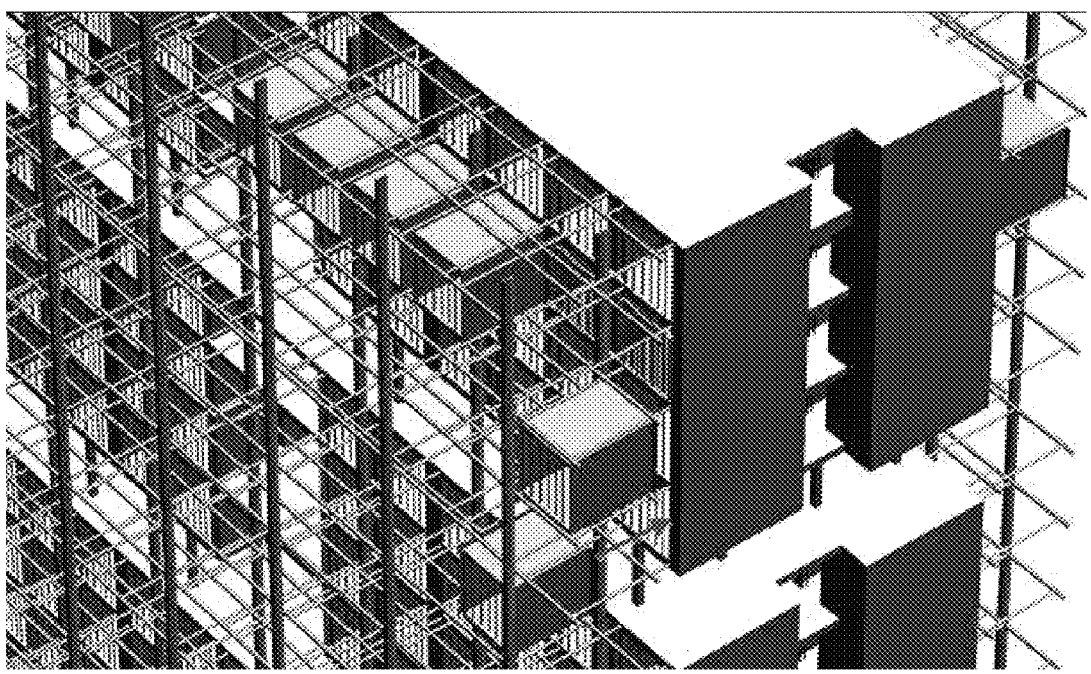
Figure 15C:
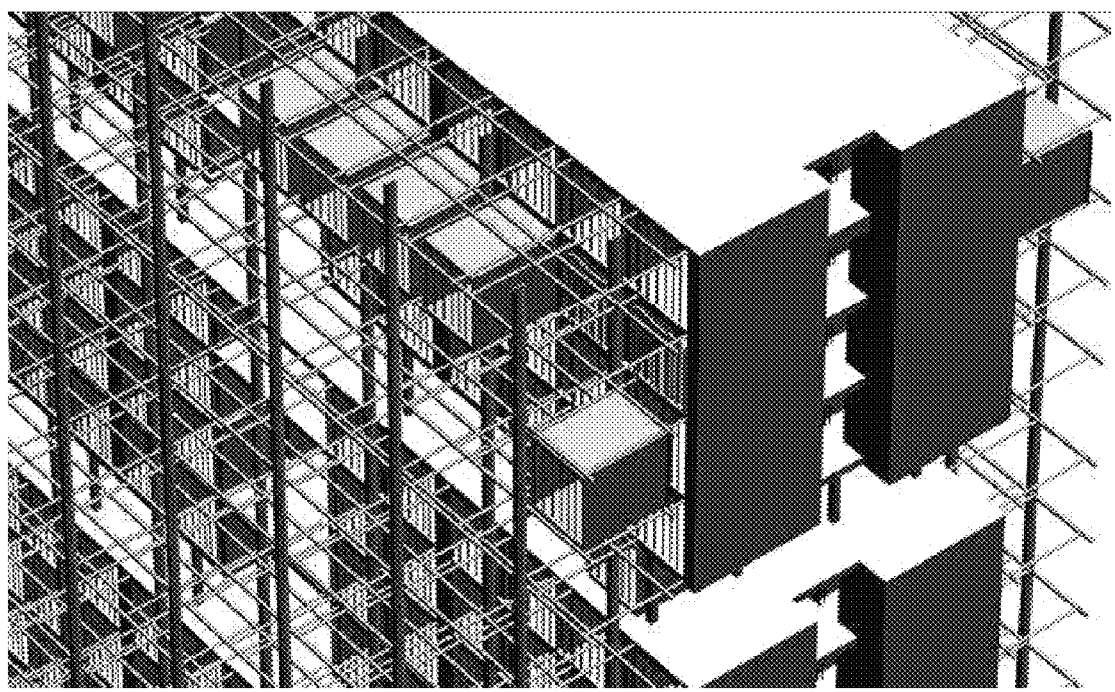

FIGS. 15A-C show an example installation process according to various embodiments. Due in part to the benefits described above, the modular rooms can be installed and uninstalled, or vice versa, within a short timeframe. In some embodiments, the modular room may be uninstalled from a first unit and immediately installed on a second unit. The modular room may be cleaned by the user of the first unit, the user of the second unit, the owner of the anchoring structure, etc. prior to, during, or after installation.

Figure 16A:
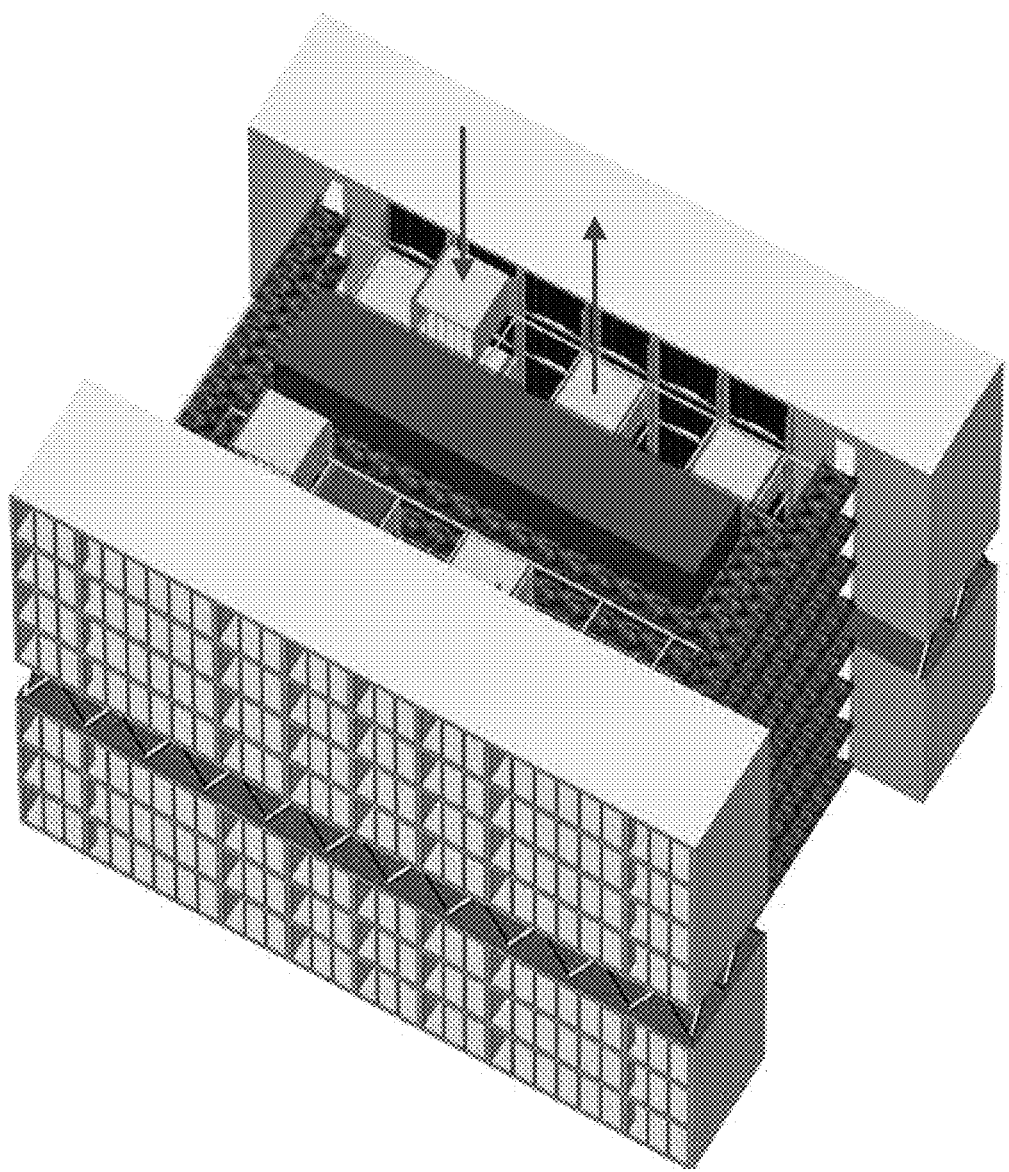
FIGS. 16A-C show another example installation process according to various embodiments.
Figure 16B:
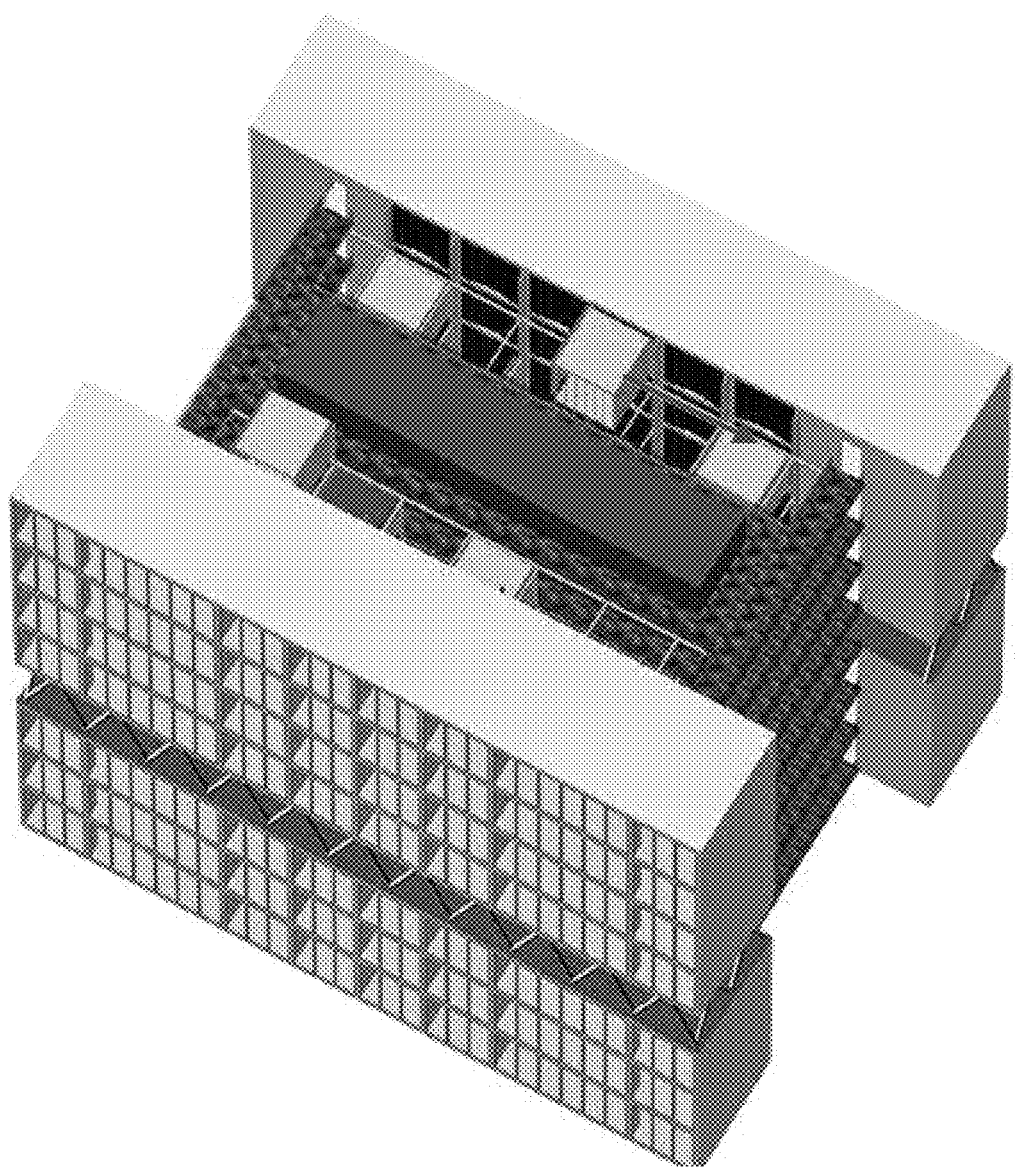
Figure 16C:
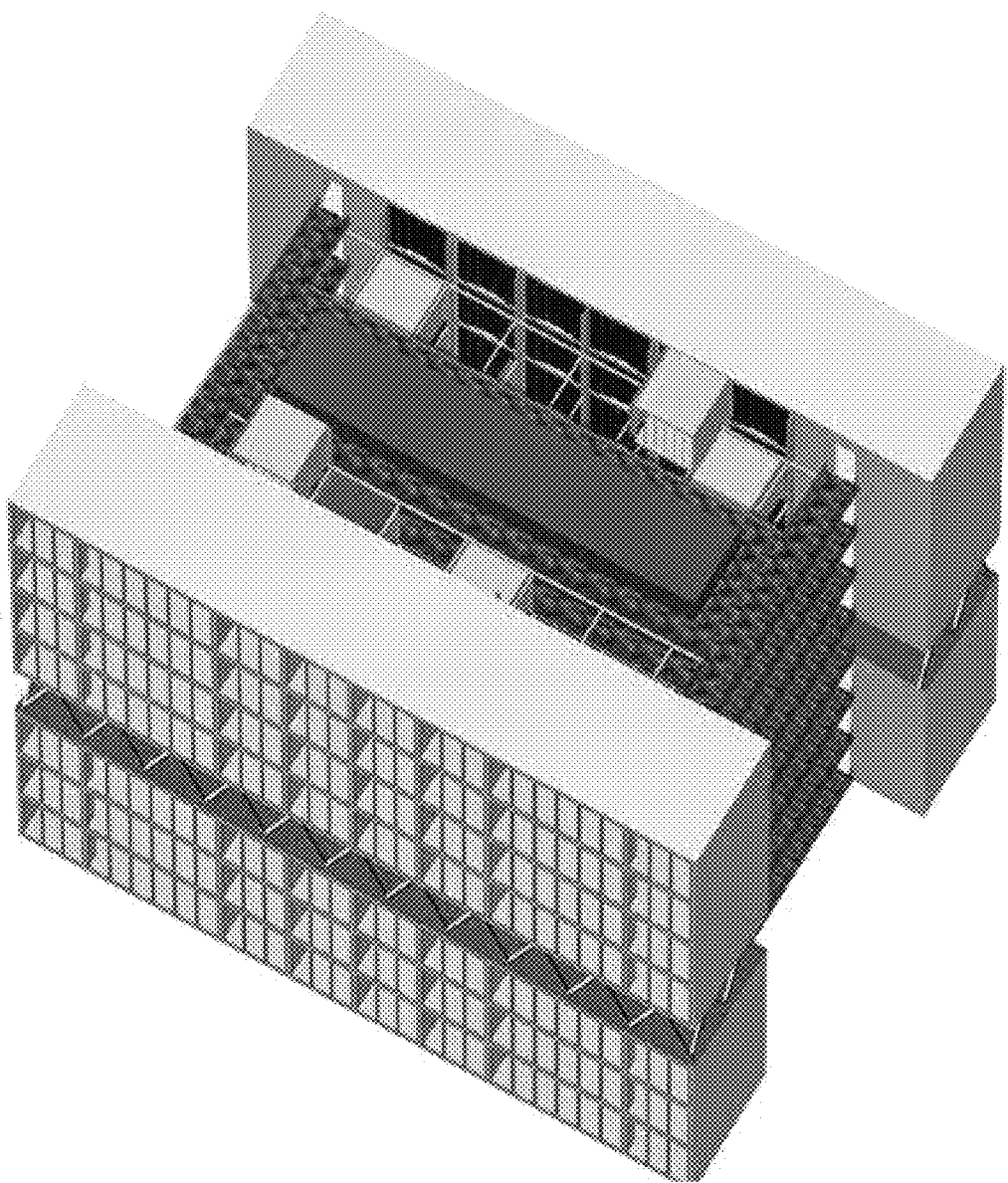

FIGS. 16A-C show another example installation process according to various embodiments. As described above, various methods of installation and transportation of the modular rooms may be implemented. For example, an elevator and track system may assist in moving modular rooms inside the anchoring structure (e.g., the modular room of FIGS. 16A-C), while a crane may be used to assist in moving modular rooms outside the anchoring structure (e.g., the modular rooms of FIGS. 14A-C).

Figure 17A:
FIGS. 17A-C show a variety of room customization modules being moved and used according to various embodiments.
Figure 17B:
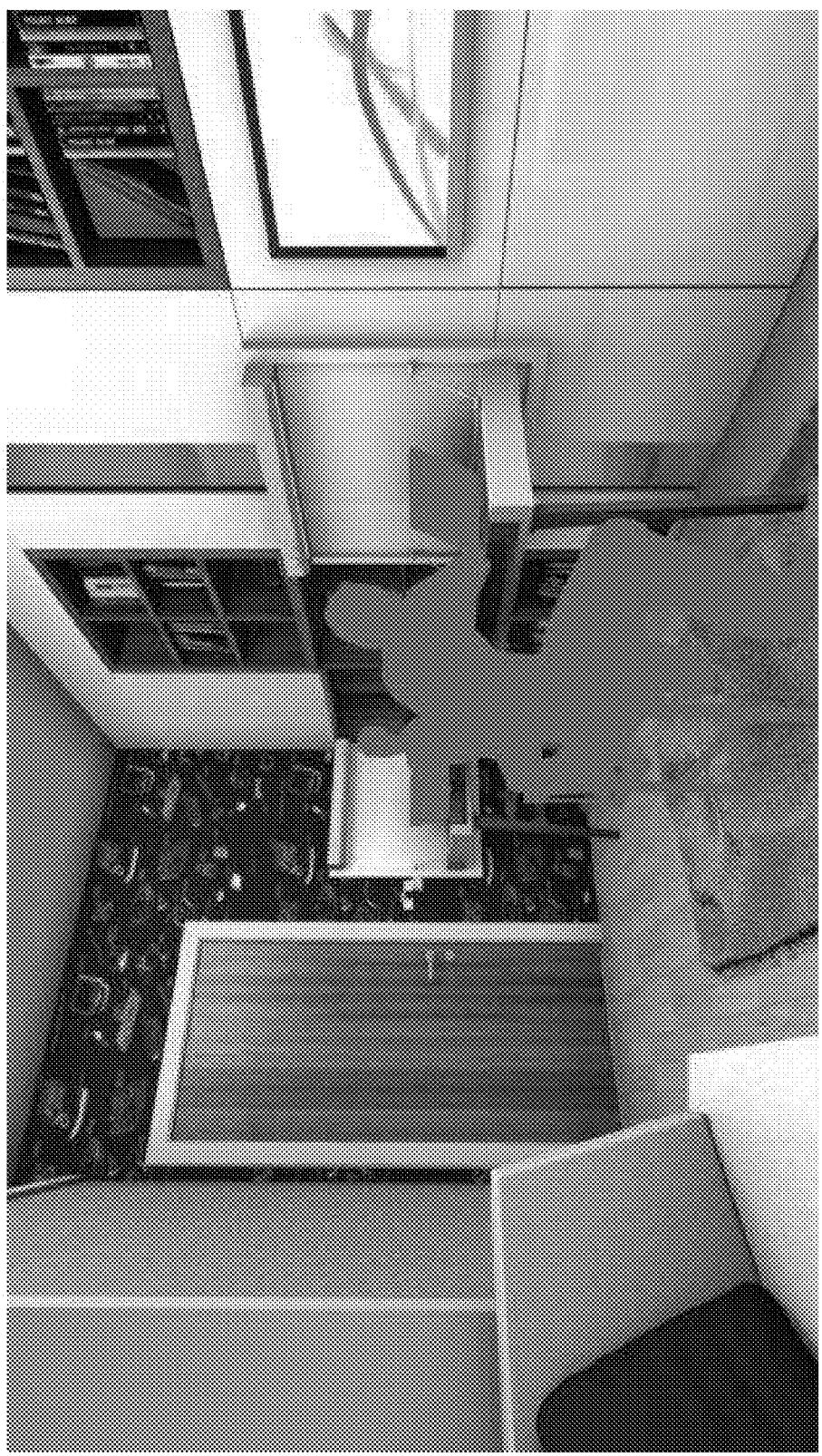
Figure 17C:

FIGS. 17A-C illustrate a variety of room customization modules being moved and used according to various embodiments. In various embodiments, the unit of the anchoring structure or the modular room may have one or more room customization modules which allow the unit and/or modular room to be customized. For example, the unit of FIGS. 17A-C is a living space with various room customization modules customized as a workstation, a coat rack, a storage drawer, etc. The room customization modules can be installed within a unit (e.g., apartment, office) to customize it for different applications. The embodiments discussed herein not only provides space-efficient features, but also gives the user an option to customize the unit, a modular room, etc. to serve a particular need and/or provide a certain utility.

Figure 18A:
FIGS. 18A-C show various room customization modules being moved, for example, in a user's central living space, in accordance with various embodiments.
Figure 18B:
Figure 18C:

Similarly, FIGS. 18A-C show various room customization modules being moved, for example, in a user's central living space. In various embodiments, the room customization modules can be installed, uninstalled, removed, etc. in such a way that the user can customize the unit, modular room, etc. Although FIGS. 18A-C display a workstation, a coat rack, and a storage drawer, the room customization modules may be configured to serve other purposes (e.g., garbage bin, television storage, music/speaker system). In some embodiments, the room customization modules are configured to be easily detachable from the unit such that a user can uninstall a first room customization module (e.g., storage drawer) and install a second room customization module (e.g., music/speaker system) without modifying the contents of either room customization module. Thus, the user can customize the properties and/or utilities of the unit in a more effective and efficient manner by using easily detachable room customization modules.

Figure 19:
FIGS. 19 and 20A-B show room customization modules being used in a kitchen area, in accordance with various embodiments.
Figure 20A:
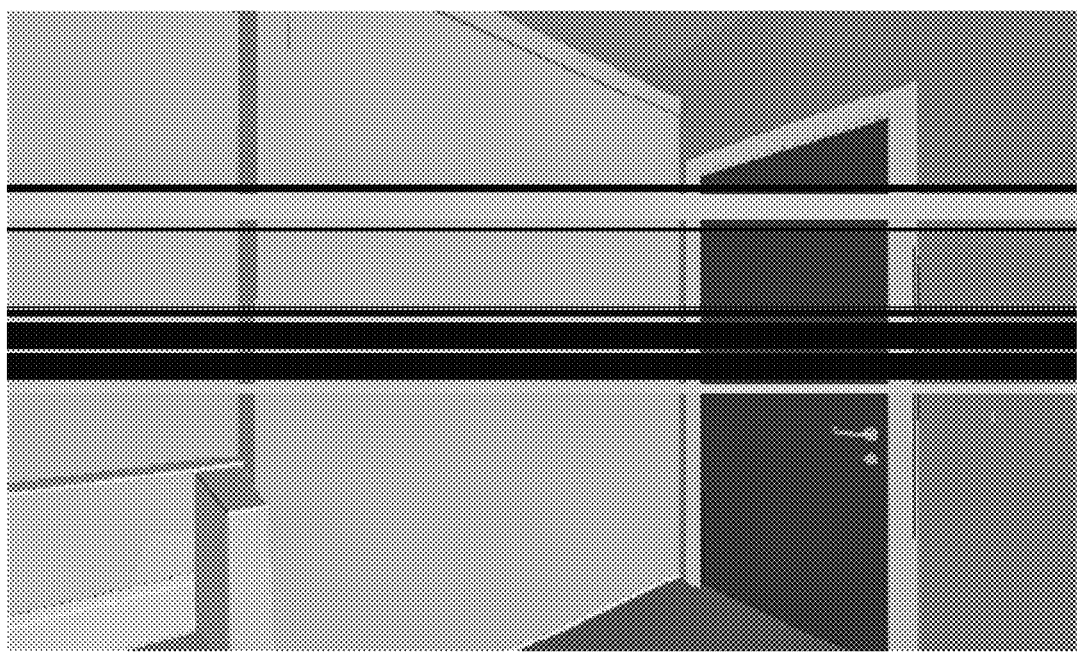
Figure 20B:
Figure 21A:
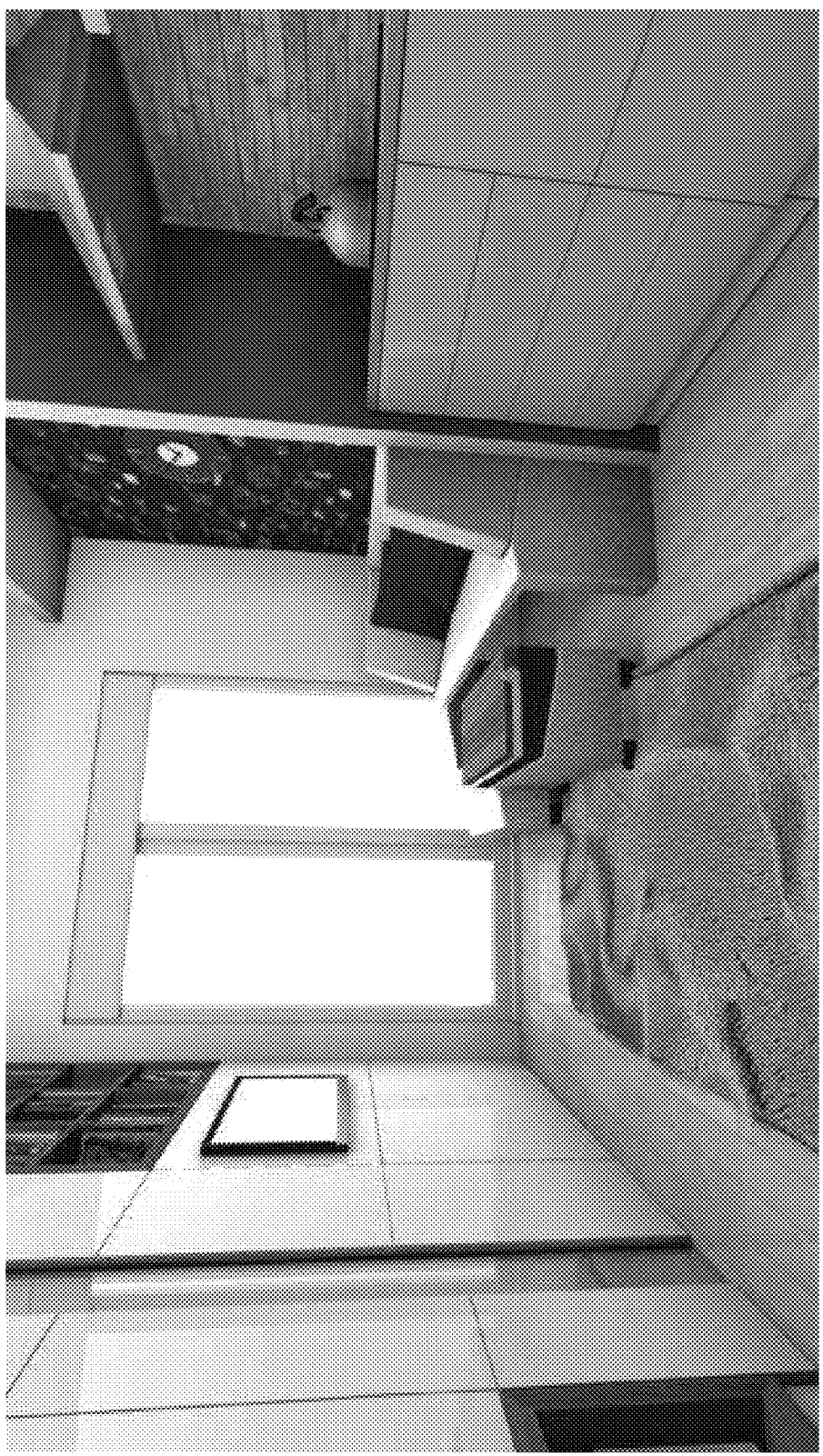
FIGS. 21A-B, 22A-C, and 23A-B show room customization modules being used in a living area, in accordance with various embodiments.
Figure 21B:
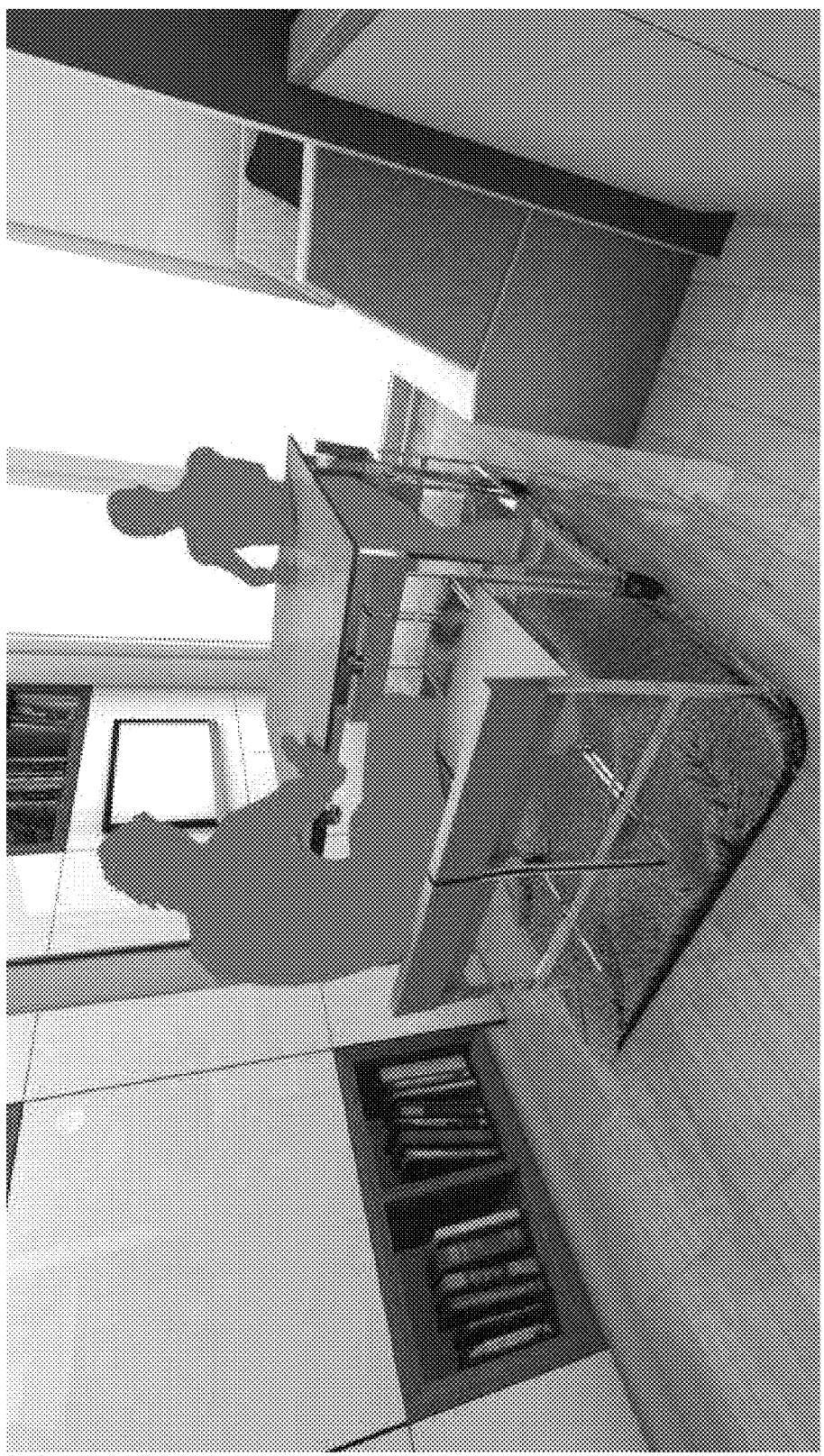

FIGS. 19 and 20A-B show room customization modules being used in a kitchen area. More specifically, FIG. 20A shows one example embodiment wherein the kitchen area is concealed from the general living area of the unit, modular room, etc. by a moveable wall. FIG. 20B, which shows the exposed kitchen following moving or removing of the moveable wall, shows a plurality of room customization modules. The room customization modules, as shown in FIGS. 19 and 20B, can operate as described above. That is, in various embodiments the room customization modules can be easily detachable from the kitchen unit such that a user can uninstall a first room customization module (e.g., microwave storage module) and install a second room customization module (e.g., additional pantry storage) without modifying the contents of either room customization module. By providing easily moveable room customization modules, the embodiments described herein allows the user to customize the unit, modular room, etc. without incurring the costs and risks associated with conventional remodeling. The embodiments described herein can be implemented in a variety of settings (e.g., an apartment complex, office building). For example, the room customization modules described above can be particularly useful for a first user who currently lives in an apartment, but whose needs vary dramatically from a second user who previously lived in the apartment. A first user (e.g., single resident) may need substantially less storage, sleeping, etc. space than a second user (e.g., family).

Figure 22A:
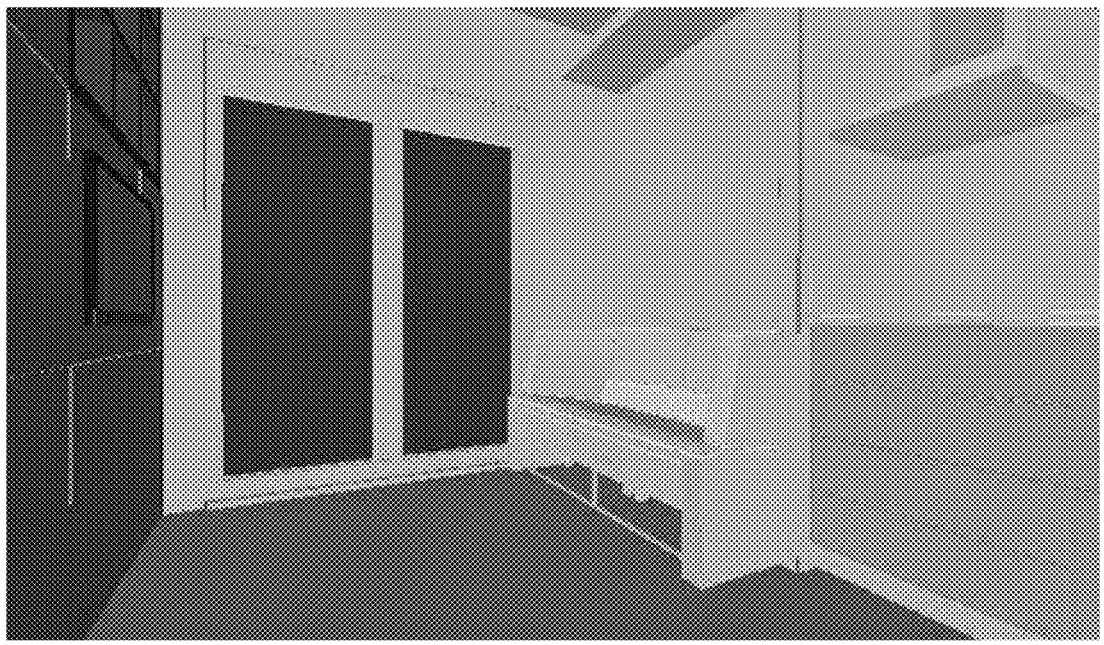
Figure 22B:
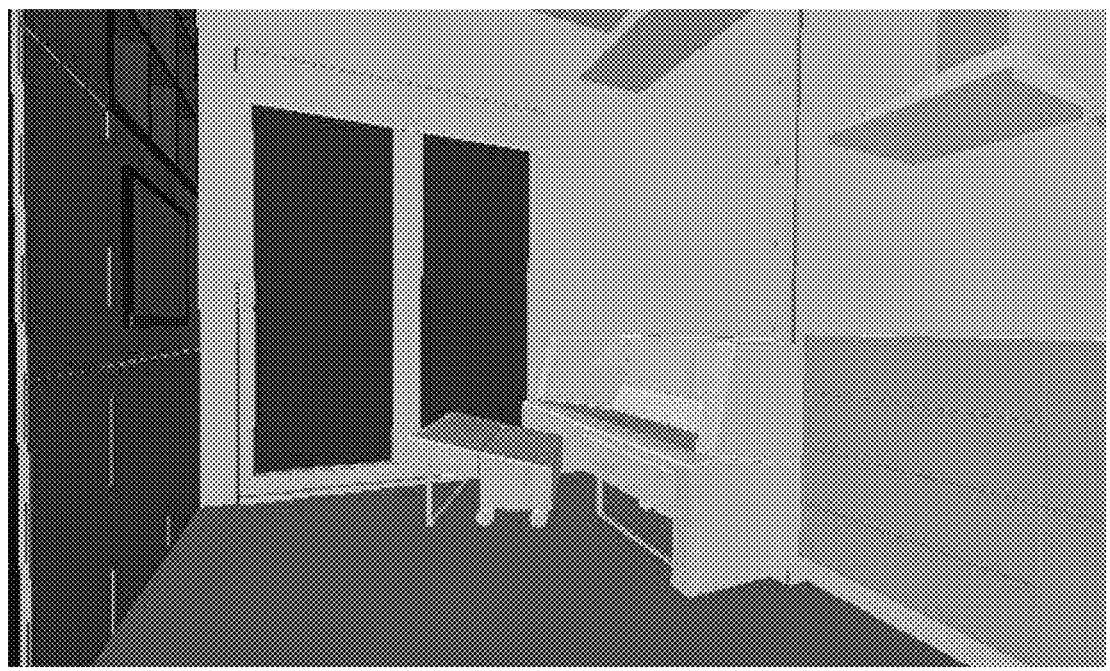
Figure 22C:
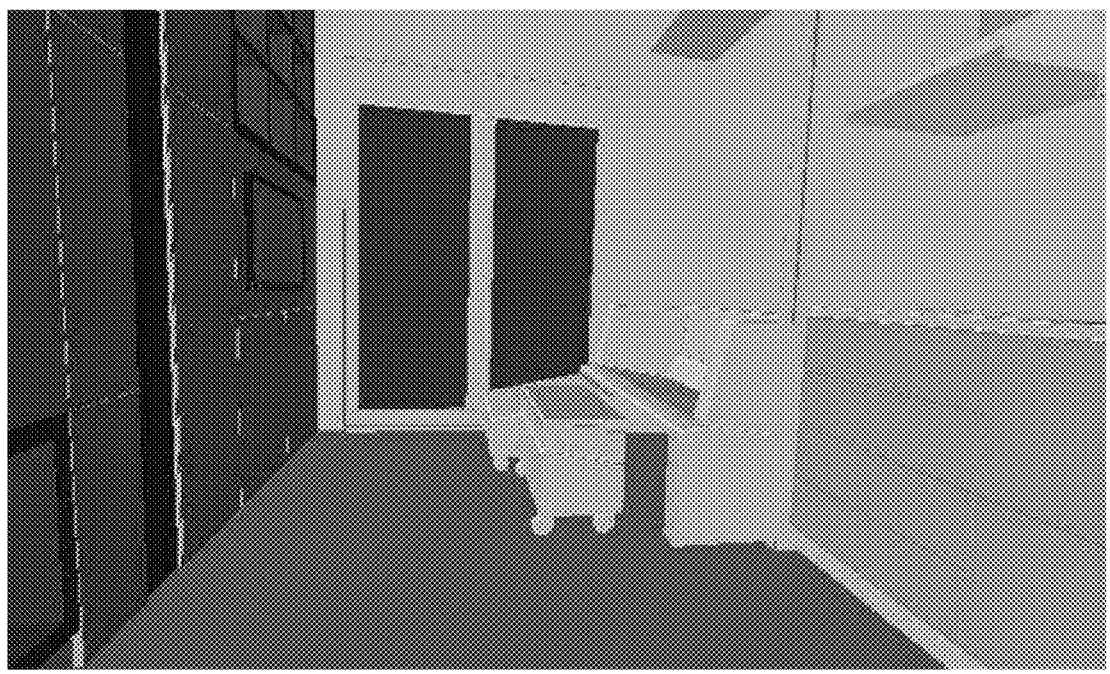
Figure 23A:
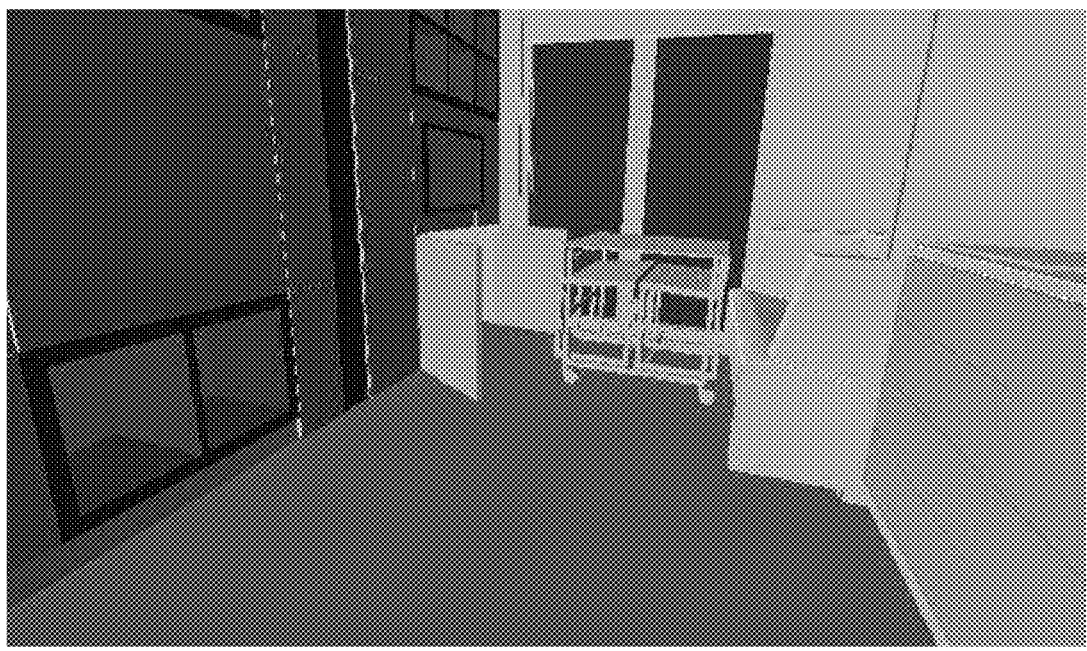
Figure 23B:
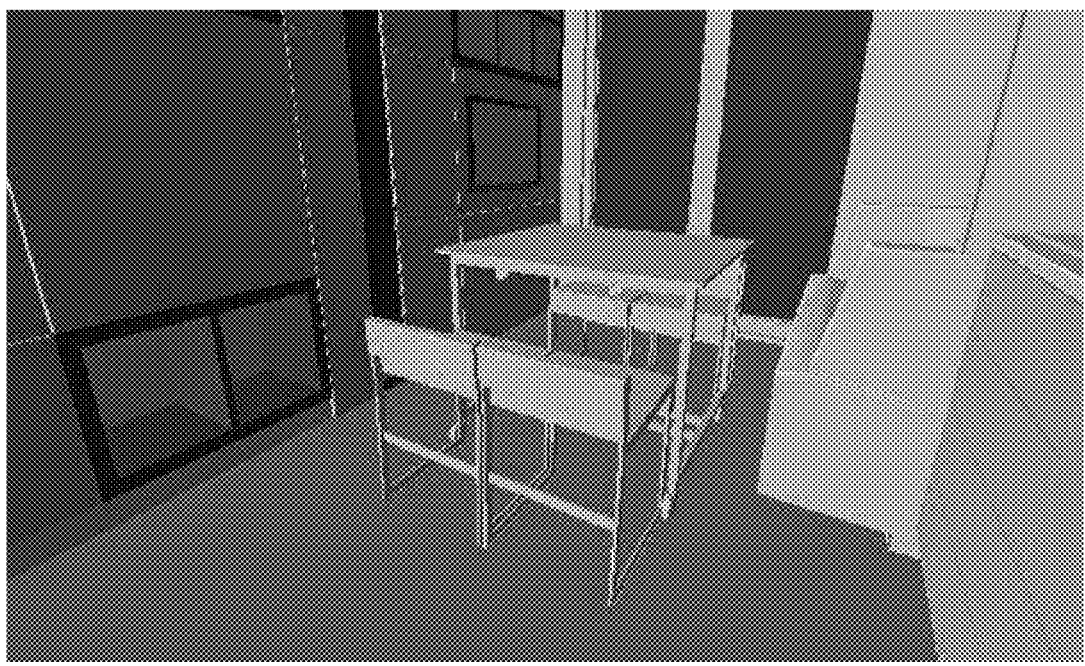

FIGS. 21A-B, 22A-C, and 23A-B demonstrate room customization modules being used in a living area. In various embodiments, the room customization modules can be installed into predefined spaces within the walls of the unit, modular room, etc., or in and around existing items. For example, FIGS. 22A-C show room customization modules configured to provide additional seating and/or leg support adapted to fit underneath an existing piece of furniture. As another example, FIGS. 23A-B show a room customization module configured to provide additional seating and/or surface space adapted to fit within the wall of the unit. The embodiment describes one or more room customization modules incorporated into (e.g., installed in) a room that provide a user with customization options.

Figure 24:
FIGS. 24 and 25A-B show two separate room customization modules configured to serve as beds, in accordance with various embodiments.
Figure 25A:
Figure 25B:
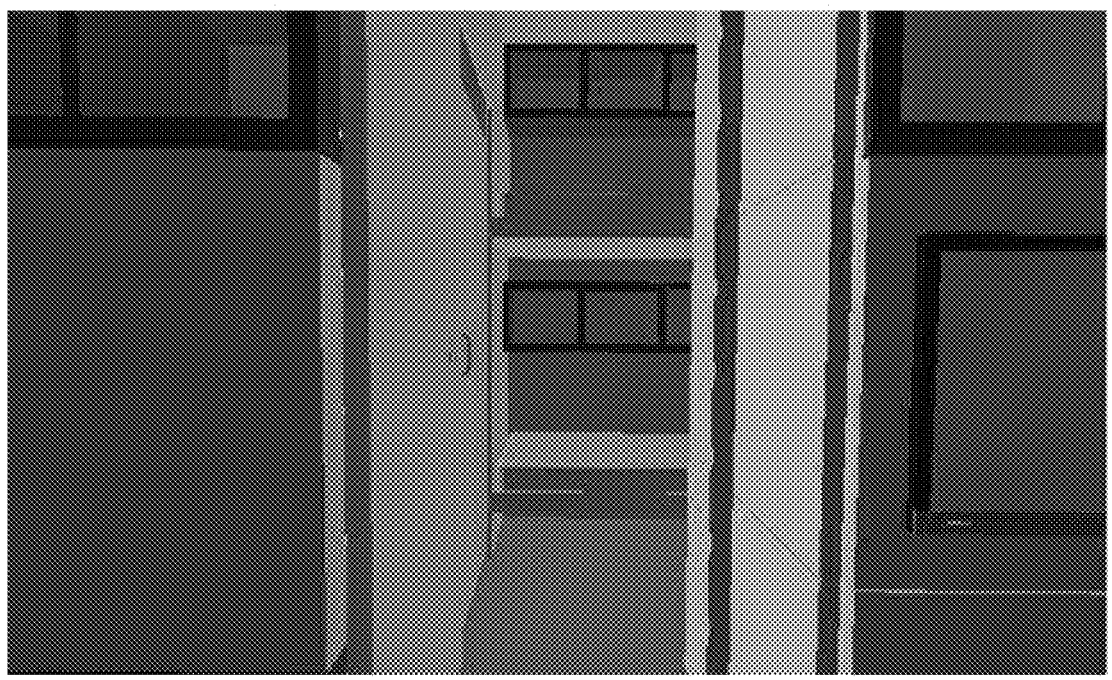
Figure 26A:
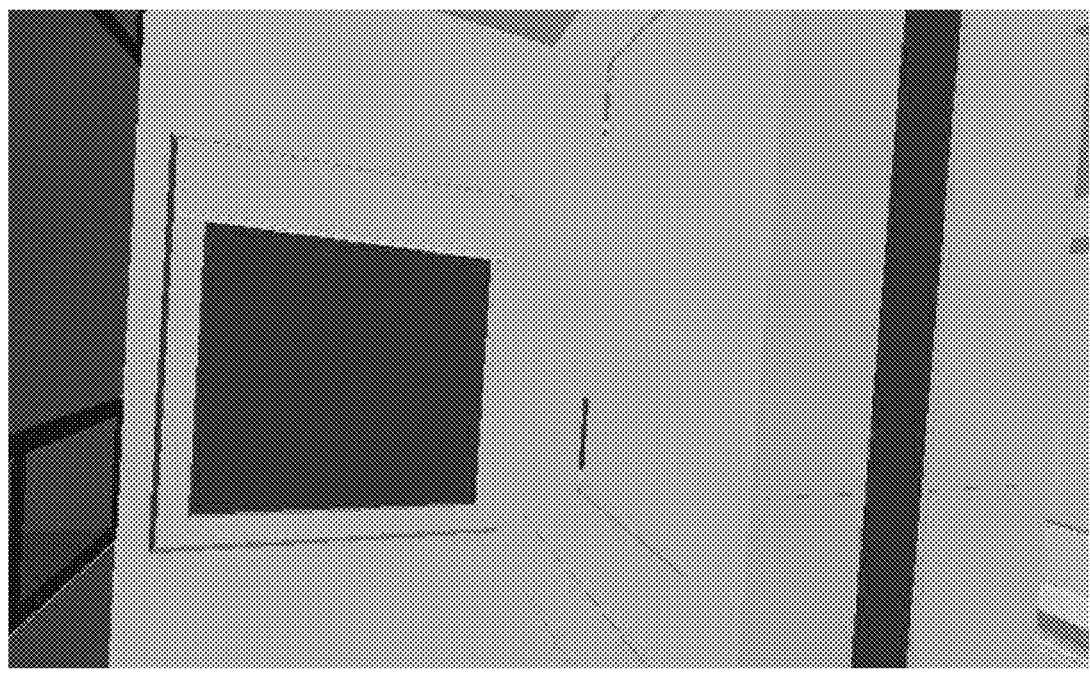
FIGS. 26A-E and 27A-C show room customization modules of a closet according to various embodiments, in accordance with various embodiments.
Figure 26B:
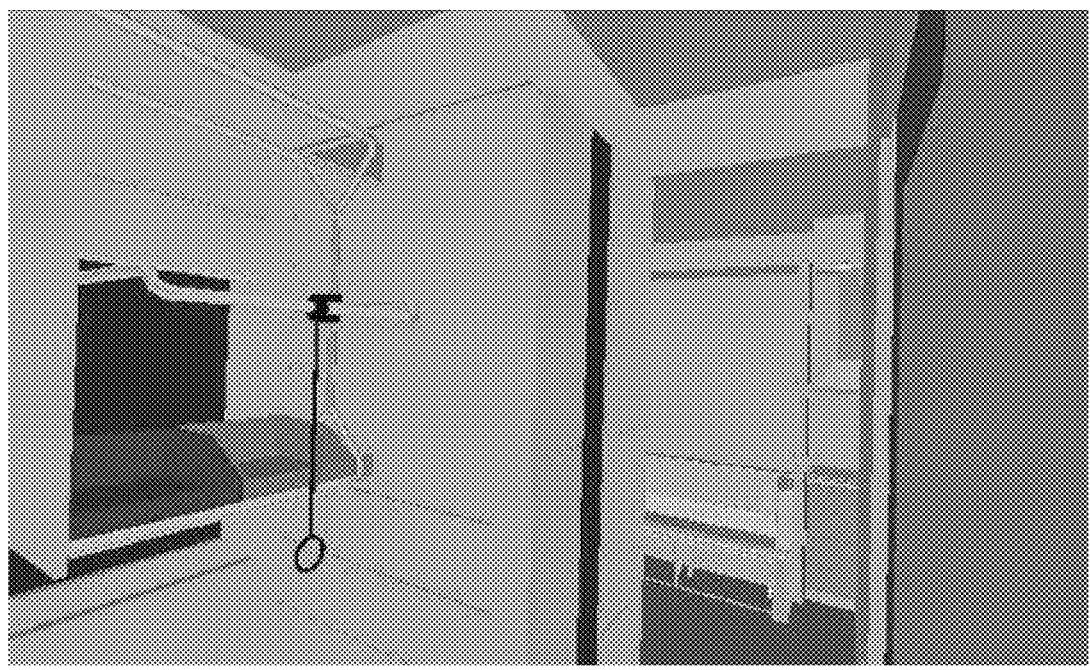
Figure 26C:
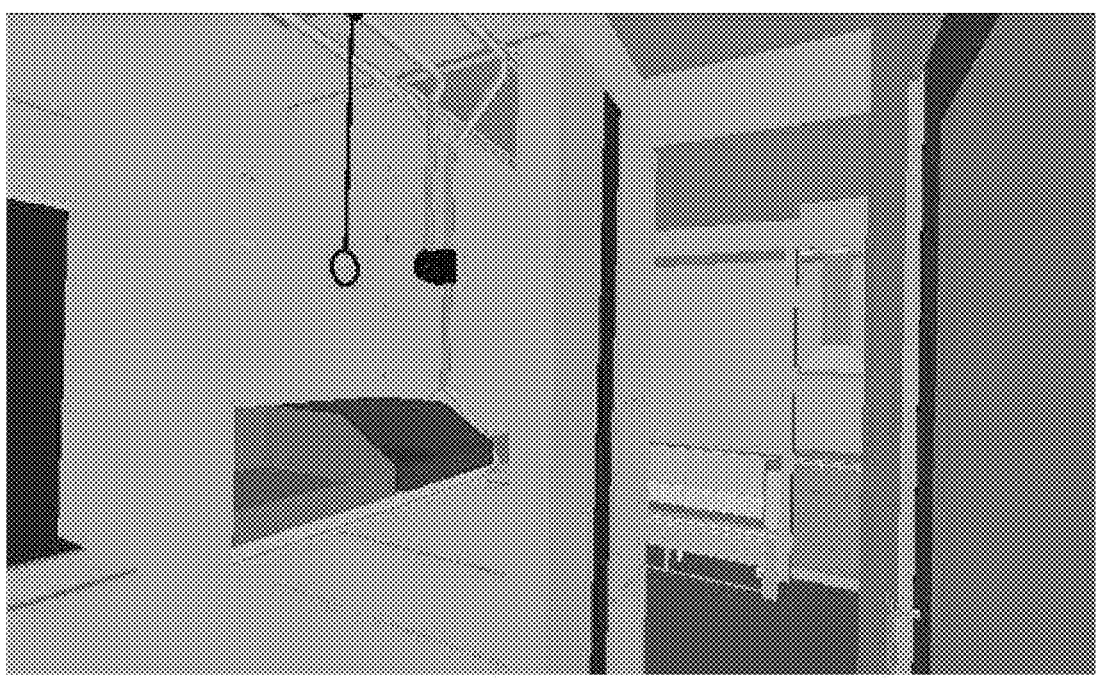
Figure 26D:
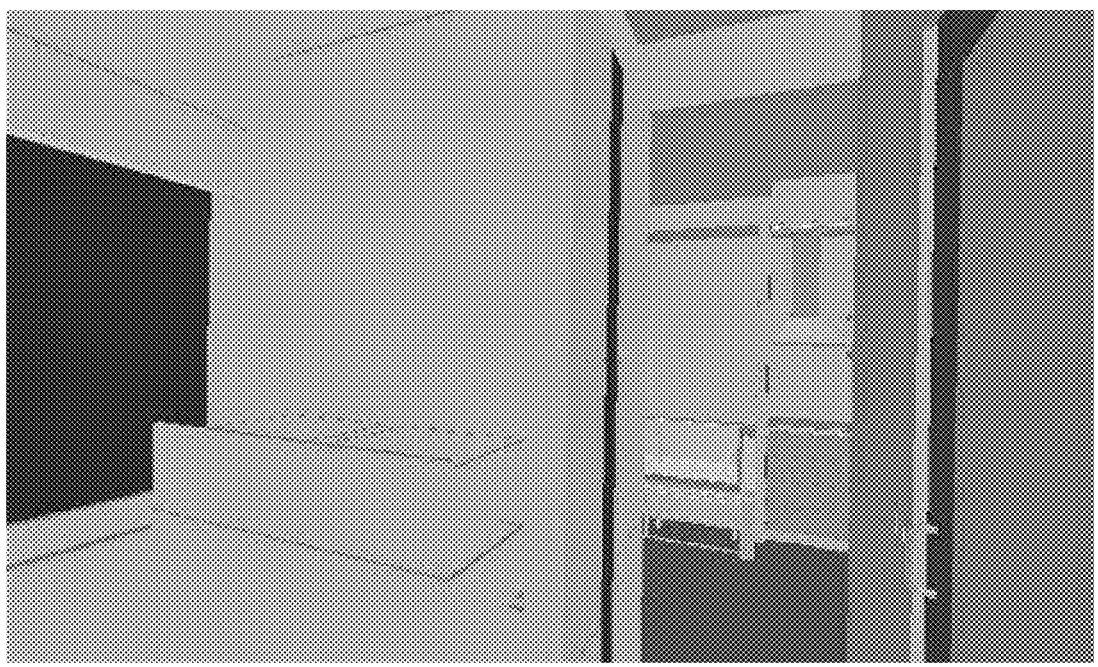
Figure 26E:
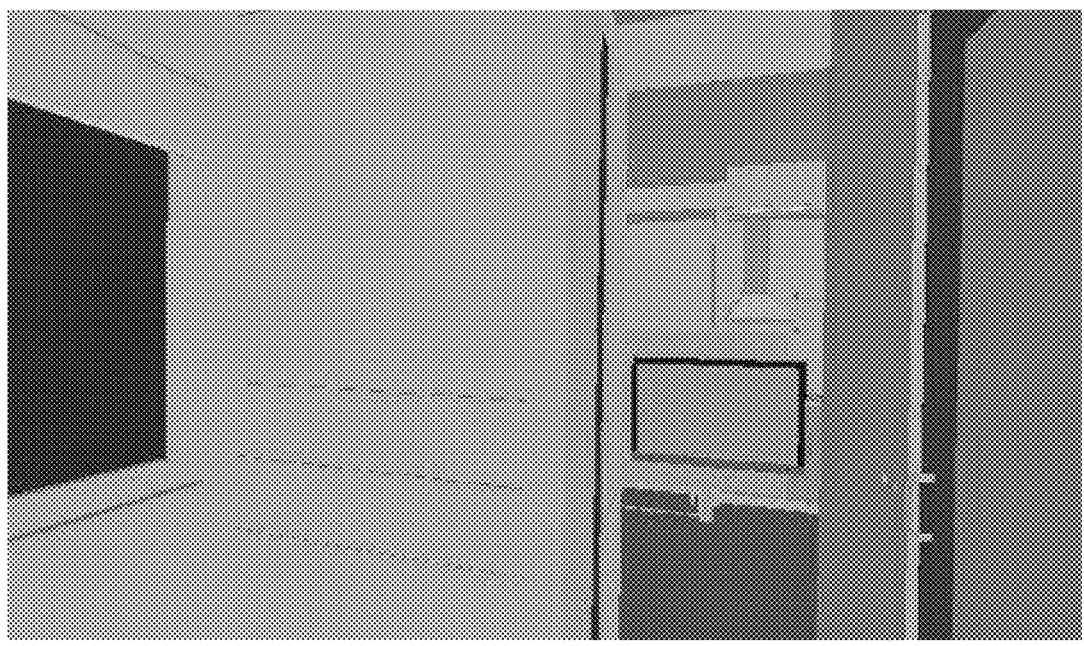

FIGS. 24 and 25A-B are illustrations of two separate room customization modules configured to serve as beds. As described above, the room customization modules (e.g., room customization modules of FIGS. 25A-B) can be installed into predefined spaces within the wall(s) of the unit, modular room, etc. Thus, the room customization modules can provide valuable living space for those users who cannot afford a large unit, live in a densely populated city, etc. In some embodiments, the predefined space(s) within the wall may be adapted to accept more than one room customization modules. For example, the predefined spaces of FIGS. 25A-B may be adapted to accept two smaller room customization modules (e.g., workstation, storage drawer) in place of one large room customization modules (e.g., bed) should the user choose to make that customization. The ability to modify the selection and arrangement of room customization modules can provide added flexibility and customization options. For example, a one-bedroom apartment can easily be transformed into a two-, three-, etc. bedroom apartment by customizing one or more room customization modules. Similarly, entire sections of the unit, modular room, etc. can be transformed by uninstalling one or more original room customization modules and installing one or more new room customization modules. For example, the living area of an apartment can be customized to provide additional kitchen space by installing one or more kitchen-related room customization modules.

FIGS. 26A-E and 27A-C show room customization modules of a closet according to various embodiments. In some embodiments, the room customization modules may be configured in the manner as shown (i.e., clothes racks above storage drawers). However, in some embodiments the arrangement of the closet may be modified by the user of the unit, modular room, etc. That is, in some embodiments the user may choose, for example, to install both storage drawers above the clothes racks, install a single storage drawer above a single clothes rack, etc.

Figure 27A:
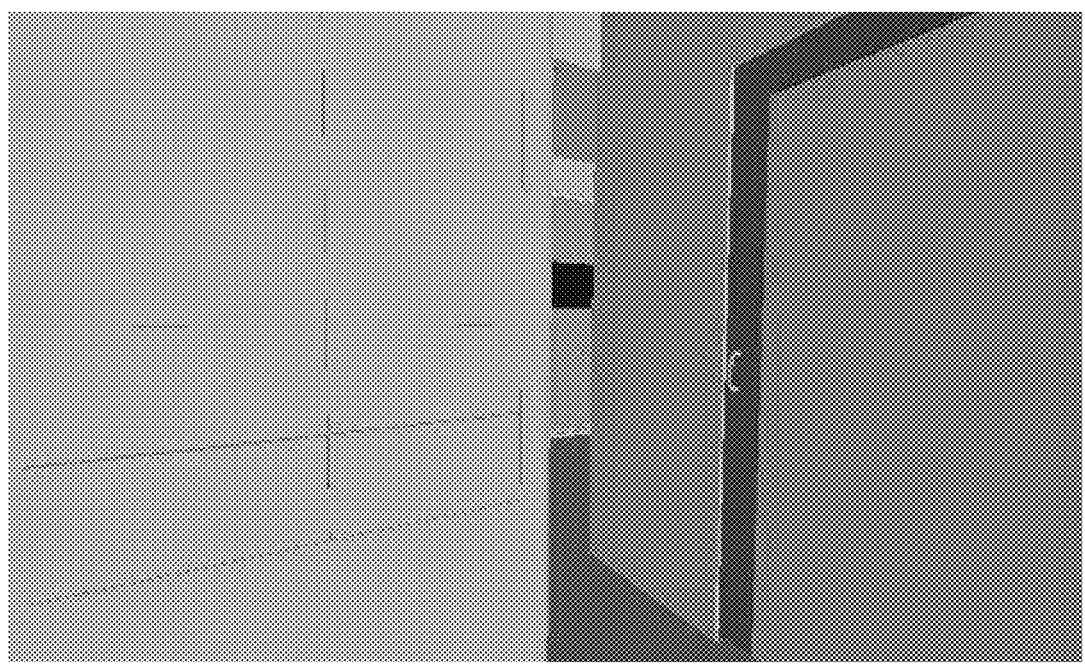
Figure 27B:
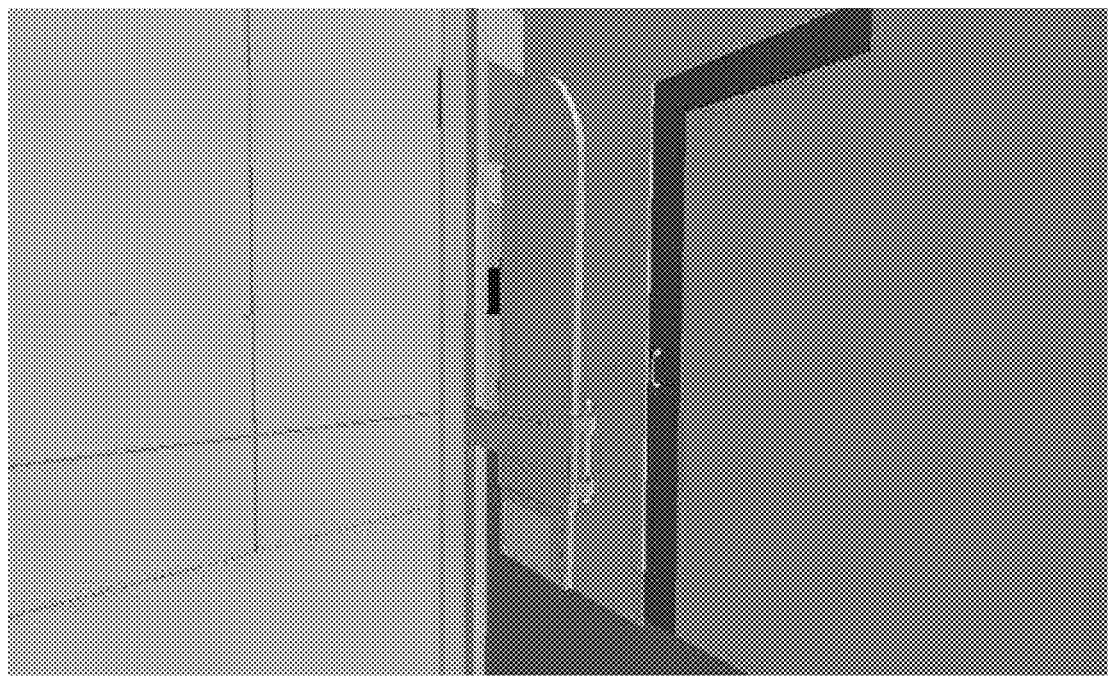
Figure 27C:

In various embodiments, the predefined spaces and/or room customization modules can be configured to fit together in a variety of ways. For example, in FIG. 26E a slidable room customization module is installed such that, when pulled open by a user, the interactive surface (e.g., television screen) is facing a first room. However, in alternative embodiments the slidable room customization module can be installed such that, when pulled open by the user, the interactive surface is facing a second room. Similarly, FIGS. 27A-C show a room customization module having an ironing board. In order to maximize efficient use of space, the room customization modules, and corresponding ironing board, are arranged in an upright manner. As described above, the plurality of room customization modules can be organized in various arrangements and can be easily installed and uninstalled by the user.

Figure 28A:
FIGS. 28A-B show one example embodiment of a modular room, in accordance with various embodiments.
Figure 28B:
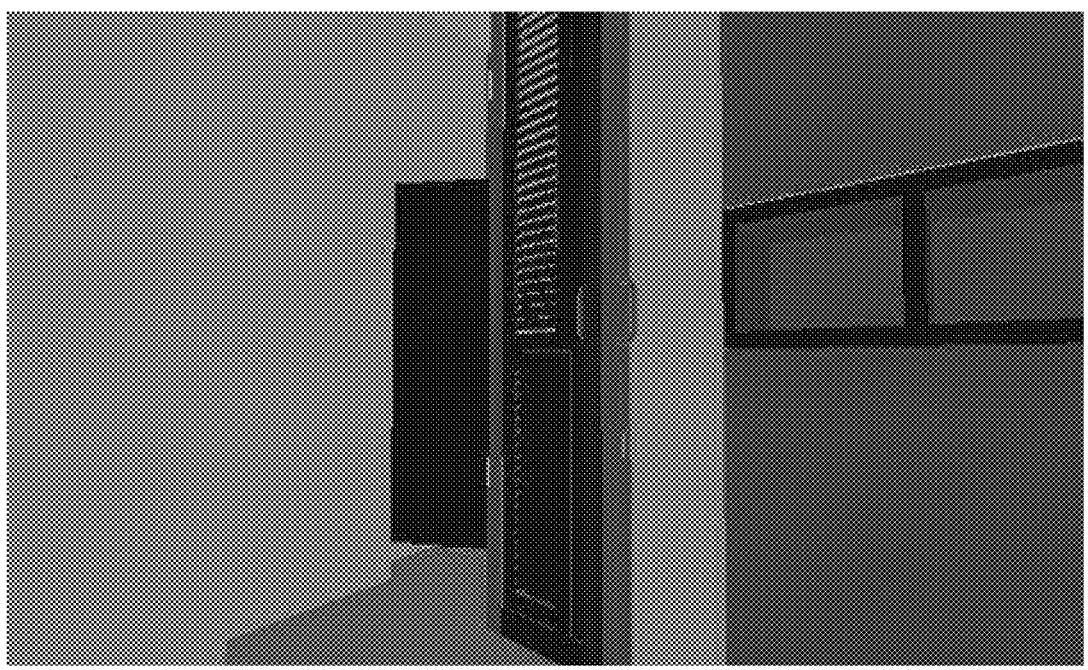

FIGS. 28A-B illustrate one example embodiment of a modular room. The modular room can be, for example, a living and storage space as shown in FIGS. 28A-B. However, in various embodiments the modular room may be adapted for entertainment, sports, business, etc.

In various embodiments, many of the areas described above can be set up as common areas to be used by more than one user of the anchoring structure (e.g., all renters of apartment complex). For example, a common area having a modular cinema, entertainment room, guest room, steam room, athletic facility, etc. could be installed within the anchoring structure such that access is provided to any number of users of the anchoring structure. In some embodiments, the common area can be installed such that all users have access, while in other embodiments a subset of users (e.g., residents of a single floor) have access.

The customizable common area can be achieved using many of the various methods and systems described above. In some embodiments, the common area is a modular room capable of being installed and uninstalled. The modular room, as described above, may be detachably connectable. When a user, or group of users, needs or wants a new modular room providing a different utility, benefit, etc., the new modular room can be easily installed.

In some embodiments, the common area is a permanent or semi-permanent structure having one or more room customization modules. The one or more room customization modules allow the common area to be customized by one or more users. For example, the common area can be customized as a work space with various room customization modules configured to provide workstations, storage drawers, etc. The room customization modules are configured to be easily detachable from the common area structure such that a user can uninstall a first room customization module (e.g., storage drawer) and install a second room customization module (e.g., music/speaker system). Thus, the common area can be easily customized to provide a different benefit based on the room customization module(s) installed.

Figure 29:
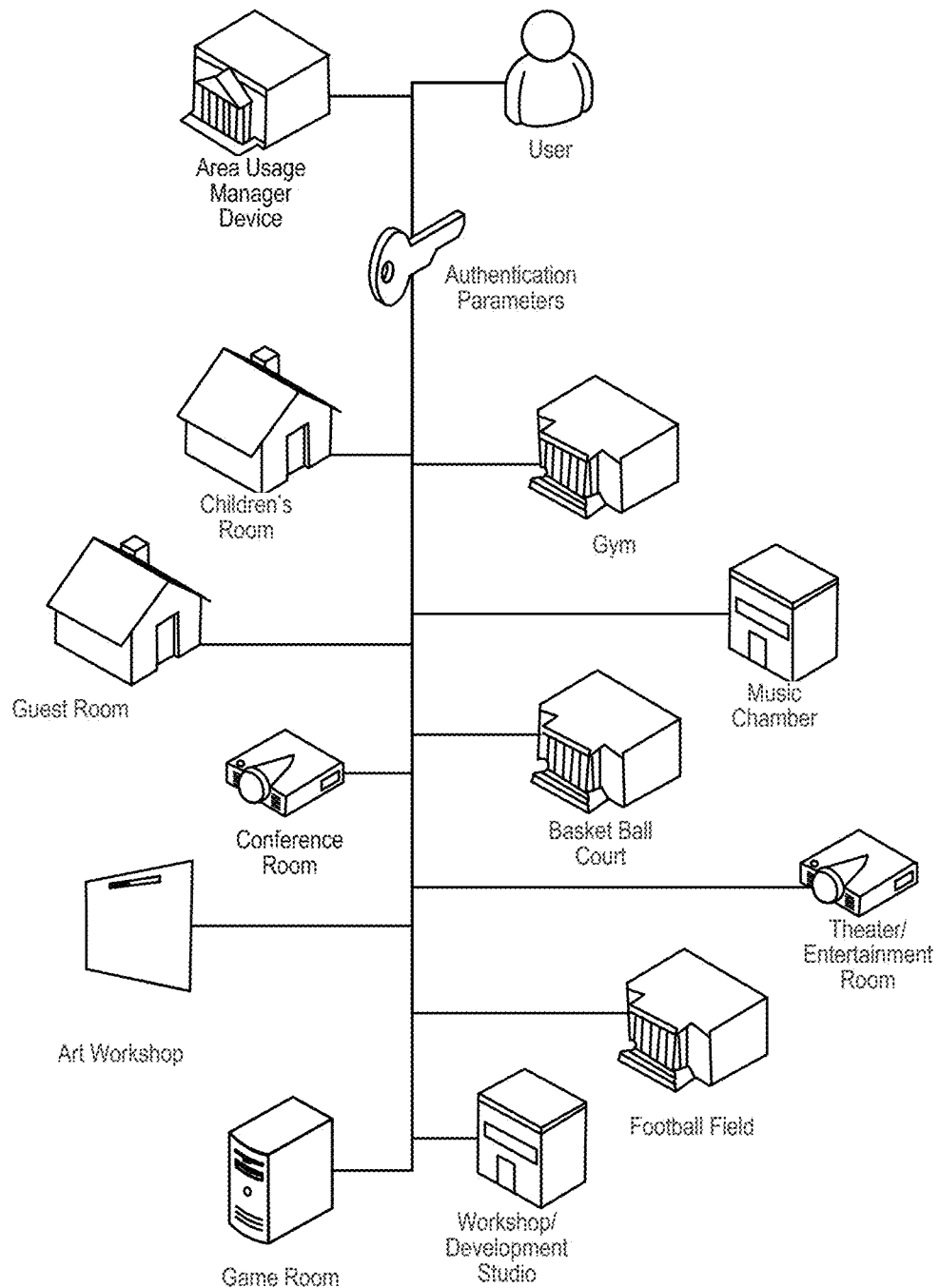
FIGS. 29-30 show a system of customizing and reserving one or more common areas at a plurality of anchoring structures, in accordance with various embodiments.
Figure 30:
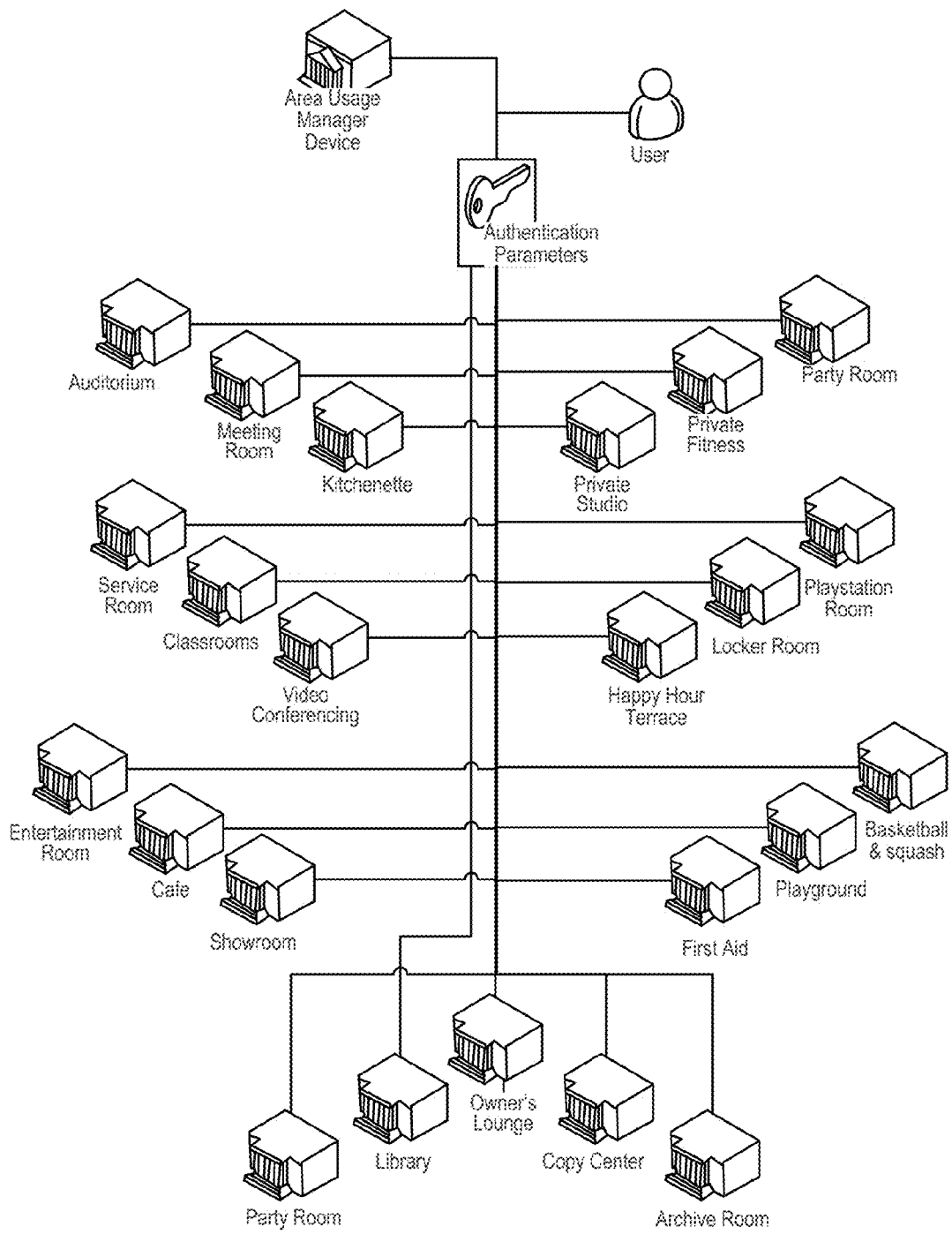

FIGS. 29-30 demonstrate a system of customizing and reserving one or more common areas at a plurality of anchoring structures. The common areas, as described above, can be implemented at a plurality of anchoring structures. In some embodiments, a computer-implemented system can assist users of a first anchoring structure plan modifications to or rent a commons area of a second anchoring structure.

In various embodiments, one or more users can use a common area (e.g., cinema, guest room, athletic facility) whenever they wish and for whatever application they wish. For example, a machine, computer-implemented software, etc. may charge a fee to uninstall an existing common room and install a new common room representing a different customized application. The common room may be configured by tools (e.g., hardware, software) that allow a user to control room customization modules, furniture, etc. The fee may also account for the utility cost of the common room. For example, the user may pay to use the common room (e.g., guest room) based on an hourly, daily, etc. rate.

In some embodiments, the contents of the room may not be accessible or usable without payment, or sufficient proof of payment, by the user. For example, the doors of the common room may be locked until payment is processed, a predetermined time is reached, an access code is entered, etc. In some embodiments, the contents of the room may be accessible, but difficult to use (e.g., lights turned off, power turned off) prior to payment, a predetermined time, etc.

In various embodiments, a mechanical machine, software-implemented security system, etc. may control access to the common room. Moreover, the machine, which can allow access, charge a fee, etc., may be a network-enabled computer system. The machine can authenticate user accounts that are associated with certain types of common rooms, enabling the user accounts to utilize one or more common rooms within a network. In some embodiments, the common rooms may also be mobilized within the anchoring structure (e.g., office building, apartment complex). In such embodiments, the users (e.g., residents, employees) can add one or more common rooms to the anchoring structure.

In various embodiments, a resource management reservation system and method of using said system may be used to authorize access and/or charge the user(s) a fee. For example, an authorized user may (1) make a reservation to use a common room at a certain location (e.g., anchoring structure), specifying the date and time for the usage; and (2) at the appropriate time, access the common room and present identification to automatically gain access to the common room. Appropriate forms of identification may be a driver's license, access card, credit card, etc. The system may maintain all necessary information, such as name, length of use, means of payment, etc. When the user(s) check out of the common room or reach the predetermined end time, the system can automatically generate a bill or charge a user's account. In various embodiments, each user can have a unique identifier. The unique identifier can be implemented in a variety of ways, including a password, personal identification number, social security number, etc.

A similar reservation system may be used for one or more room customization module used by a user. The user may be able to (1) reserve a room customization module, specifying the date and time for the usage; (2) install and access the contents of said room customization module; (3) uninstall said room customization module; and (4) receive a bill automatically generated by the system based on contents of the room customization module, length of use, etc.

Figure 31:
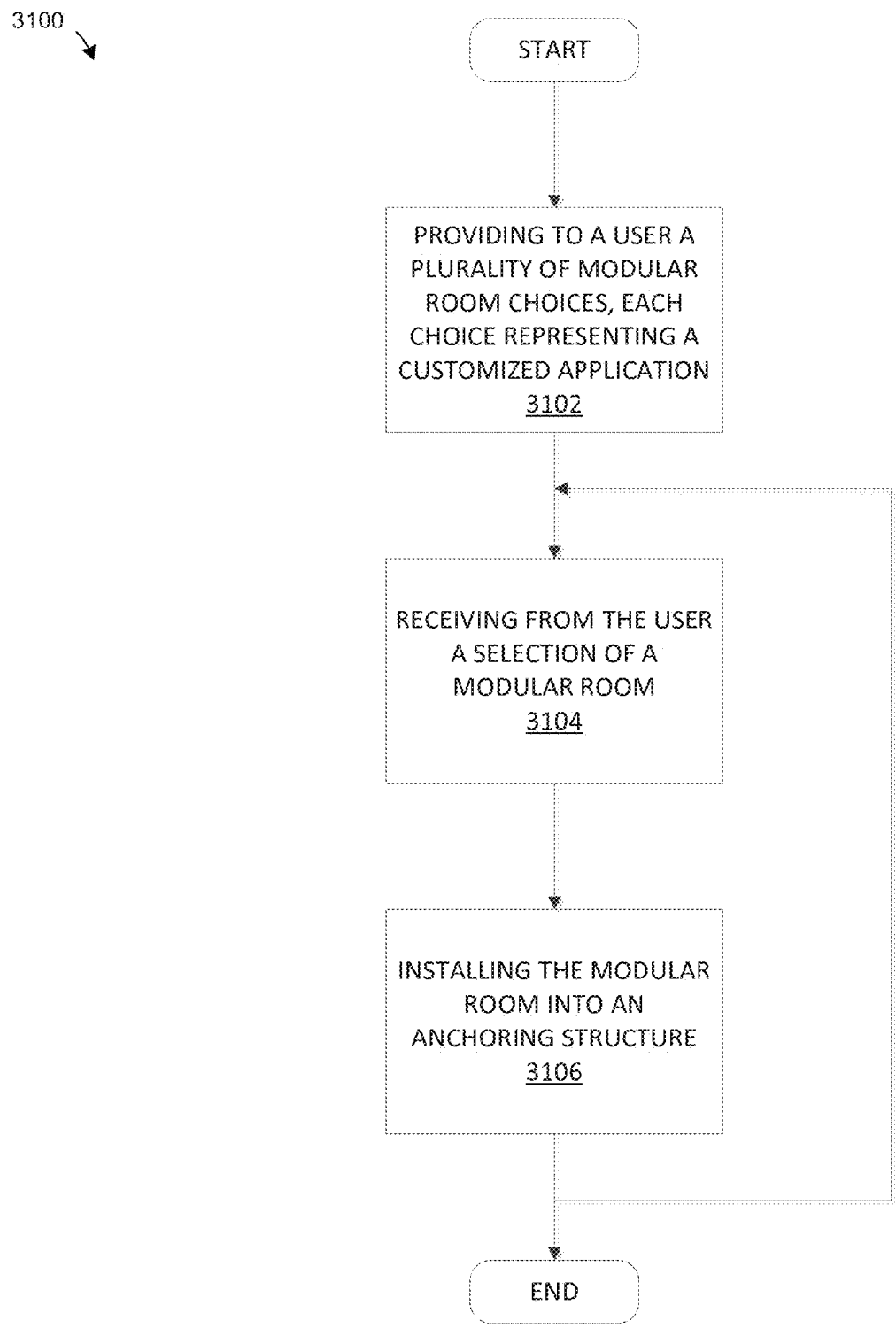
FIG. 31 shows a method of customizing using one or more modular rooms, in accordance with various embodiments.

FIG. 31 shows a method 3100 of customizing using one or more modular rooms. As described above, the user of the unit (e.g., apartment, office) can have a plurality of modular rooms available to choose from, wherein each modular room represents a customized application (e.g., entertainment, sports, business). In some embodiments, the modular room choices may be provided to the user based on application. For example, if the user selects "Athletics," all modular room choices may be related to athletics (e.g., basketball hoop, treadmill, weightlifting equipment). Once the user selects a modular room, the modular room can be installed using the various techniques described above. In various embodiments, the modular room can be detachably connected to the anchoring structure. In such embodiments, a first modular room can be easily uninstalled if the user subsequently selects a second modular room. The system and methods of modular room customization described herein allow the user to customize her unit (e.g., apartment, office) while limiting the financial burden associated with additions and/or remodeling.

At step 3102, a module installation system can provide a user a plurality of modular room choices to select from. Each of the choices can represent a customized application. At step 3104, the module installation system can receive from the user a selection of a modular room. At step 3106, the module installation system can install the modular room into an anchoring structure.

Figure 32:
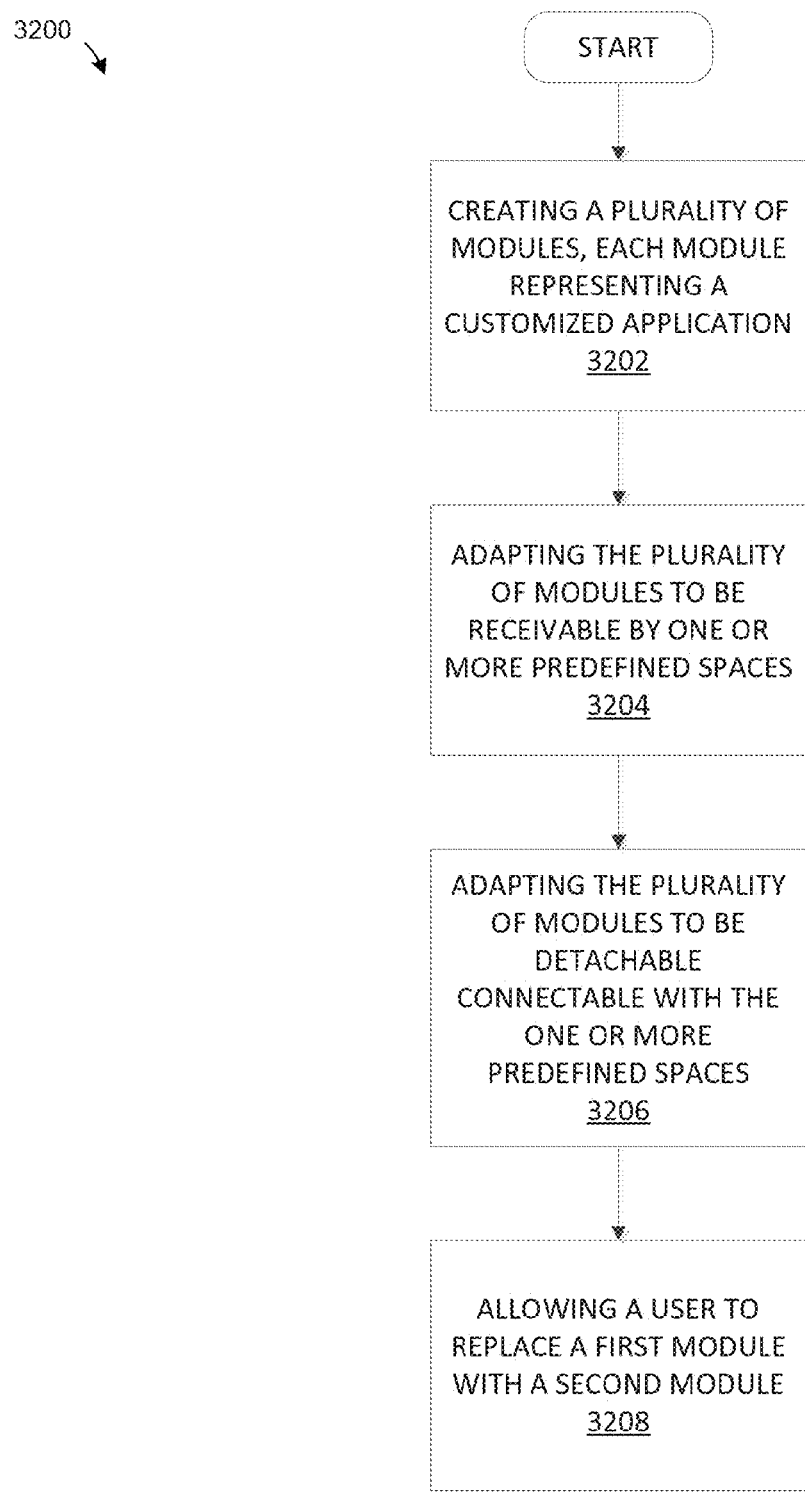
FIG. 32 shows a method of customizing using one or more room customization modules, in accordance with various embodiments.

FIG. 32 shows a method 3200 of customizing using one or more room customization modules. As described above, the user of a unit can have a plurality of room customization modules to choose from, wherein each room customization module represents a customized application (e.g., storage space, workstation). In various embodiments, each room, wall, etc. of the unit can have one or more predefined spaces capable of receiving one or more room customization module. For example, a large predefined space can be adapted to receive one large room customization module, two medium room customization modules, 4 small room customization modules, etc., or any combination thereof. In various embodiments, the room customization modules can be adapted to detachably connect with the predefined spaces. The detachably connectable room customization modules can be easily installed and/or uninstalled by the user.

As shown in FIG. 32, a user can select and install a first room customization module into a predefined space. Subsequently, the user can replace the first room customization module with a second room customization module, wherein the second room customization module may represent a different customized application, a different size, etc. In some embodiments, a customized room (i.e., room with one or more customization modules) may utilize the same structural frame and/or computer-implemented method (e.g., resource management reservation system) as a moveable modular room.

At step 3202, a room configuration system can create and/or configure a plurality of room customization modules. These room customization modules can be fixtures, appliances, furniture, or any combination thereof. Each of the room customization modules can be associated with a customized application (e.g., kitchen, gym, children's room, bedroom, bathroom, laundry room, living room, work studio, theater, conference room, or any combination thereof. At step 3204, the room configuration system can adapt the plurality of room customization modules to be receivable by one or more predefined spaces in a configurable room. At step 3206, the room configuration system can adapt the plurality of room customization modules to be detachably connectable with one or more predefined spaces. At step 3208, the room configuration system can allow a user to replace a first room customization module with a second room customization module.

Figure 33:
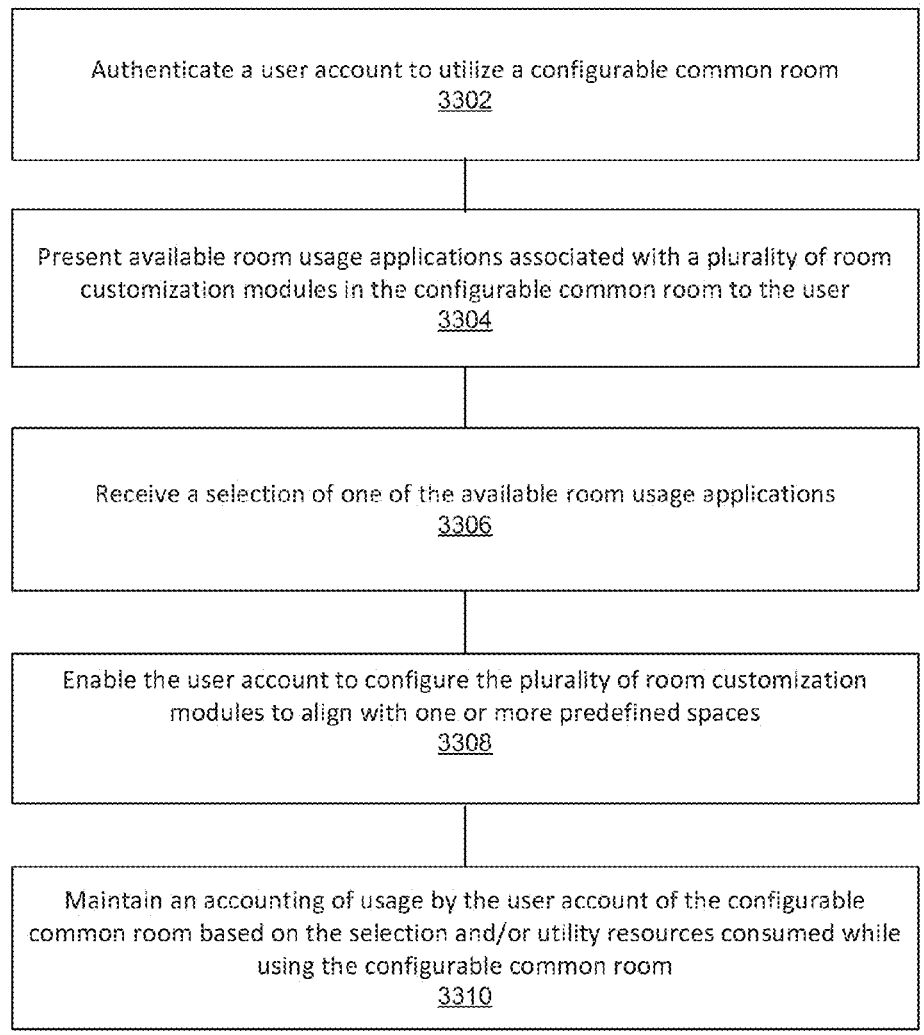
FIG. 33 is a flow chart of a method of securitizing a configurable common room, in accordance with various embodiments.

FIG. 33 is a flow chart of a method 3300 of securitizing a configurable common room, in accordance with various embodiments. At block 3302, a computer system (e.g., one or more computing devices with a processor or a controller) can authenticate a user account to utilize a configurable common room. At block 3304, the computer system can present available room usage applications associated with a plurality of room customization modules in the configurable common room to the user.

At block 3306, the computer system can receive a selection of one of the available room usage applications. At block 3308, the computer system can enable the user account to configure the plurality of room customization modules to align with one or more predefined spaces. In some embodiments, enabling the user account includes sending a command to unlock at least a subset of the room customization modules. In some embodiments, enabling the user account includes sending a command to unlock a doorway into the configurable common room. In some embodiments, enabling the user account includes mechanically actuating or moving at least a subset of the room customization modules. At block 3310, the computer system can maintain an account of usage of the configurable common room by the user account based on the selection or utility resources (e.g., water, electricity, network connection/bandwidth, phone connection, TV connection, garbage disposal, etc.) consumed while using the configurable common room.

While processes or blocks are presented in a given order in this disclosure, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 34:
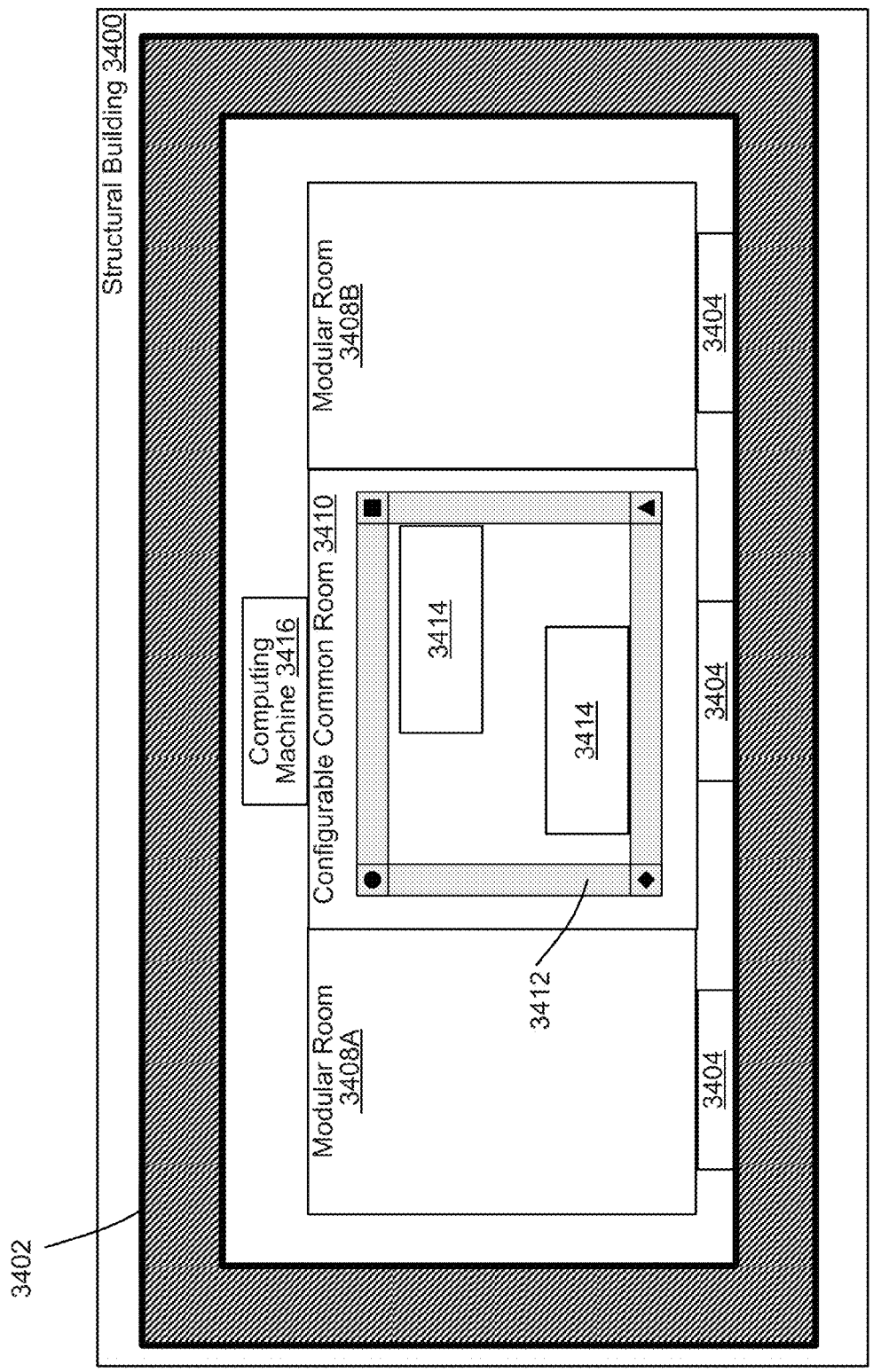
FIG. 34 is a block diagram of a modular structural building, in accordance with various embodiments.

FIG. 34 is a block diagram of a structural building 3400, in accordance with various embodiments. The structural building 3400 includes a building frame 3402 and one or more anchoring structures 3404 fixated to the building frame. One or more moveable modular rooms (e.g., a modular room 3408A, a modular room 3408B, etc., collectively as the "moveable modular rooms 3408") are adapted to be detachably connectable to at least one of the anchoring structures 3404. For example, a first modular room can represent a first customized application to use the first modular room. In some embodiments, the anchoring structures 3404 are adapted to enable replacement of the first moveable modular room with a second moveable modular room utilizing a releasable anchor (e.g., at least one of the anchoring structures 3404 being the releasable anchor).

In some embodiments, the moveable modular rooms 3408 includes a configurable common room 3410. The configurable common room 3410 can be placed to be adjacent to or surrounded by two or more unconfigurable bedrooms or offices. The configurable common room 3410 includes a room structural frame 3412 and one or more room customization modules 3414, each configured to present a room usage utility and coupled to the room structural frame 3412. The room customization modules 3414 can represent different, similar, or identical room usage applications.

The room structural frame 3412 can have a predefined space adapted with a coupling-and-release mechanism. A room customization module can be adapted to be detachably coupled to the room structural frame 3412 via the coupling-and-release mechanism at the predefined space. The room customization modules 3414 can be permanently or detachably attached to the room structural frame 3412. The room structural frame 3412 is adapted to be inserted and detachably coupled and inserted into a modular building.

Various embodiments described herein include a variety of methods and systems for improving the creation and customization of modular building structures (e.g., a prefabricated modular room, prefabricated stairs, or other building-level structures) and room customization modules (e.g., modular attachments of furniture, appliances, tools, and emulated fixture). In some embodiments, a movable modular room (e.g., office, bedroom) arrives and can be attached to a structural building and/or an unmovable room supported by a structural frame. The movable and unmovable rooms may be configurable (i.e., containing one or more room customization modules) or non-configurable. The structural building and/or structural frame enables the movable modular room to be attached and detached. In some embodiments, the movable modular room has a customized application (e.g., entertainment, sports, business). The customized application may, for example, be implemented using one or more room customization modules (e.g., tools, appliances, furniture, fixtures). The room customization modules can be detachably coupled to a structural frame of the movable modular room and/or an unmovable room that is part of the structural building. In some embodiments, the structural building and/or structural frame enable a user to change the customized application of the movable modular room by moving, folding, etc. room customization modules within the movable modular room. In some embodiments, an unmovable room (i.e., room permanently coupled to the structural building and/or frame) may be customized in a similar manner. A configurable room can be any room, movable or unmovable, that comprises one or more room customization modules.

In various embodiments, a computer-implemented system and method can be used to organize a movable modular room, reconfigure a movable modular room, move a movable modular room, coordinate timing (e.g., of moving rooms, reservations by more than one user), calculate cost, generate a bill, receive and process payment of fees by a user, and control one or more room customization modules (e.g., fixtures, appliances) of a movable modular room.

For example, a user may request a first modular room, which represents a bedroom, be installed prior to receiving guests. The first modular room can comprise one or more room customization modules that represent necessary attributes of a bedroom (e.g., bed, side table). However, in some embodiments, the user can reconfigure the first modular room, thereby changing its customized application. For example, the user may fold a first customized module (e.g., bed) into a first wall of the first modular room, and unfold a second customized module (e.g., gaming system) and a third customized module (e.g., couch) from a second and a third wall of the first modular room. The reconfiguration by the user may change the customized application of the movable modular room. One skilled in the art will recognize that room customization modules may be designed to fold into the wall, floor, ceiling, etc. In some embodiments, a movable modular room may comprise a plurality of room customization modules that allow a user to customize the movable modular room into one or more of a guest room, multimedia room, meeting room, office, home cinema, music studio, sports room, sauna, gym, etc.

In several embodiments, the configurable common room 3410 can be coupled to a computing machine 3416. The computing machine 3416 can be configured to control a mechanical actuator or an electronic switch that controls access to the room customization modules 3414. The mechanical actuator or the electronic switch can be coupled to a lock or a mechanism to expand or contract the room customization modules. The computing machine 3416 can be configured to implement an authentication interface to authorize access into the configurable room. The computing machine 3416 can be configured to implement a reservation interface to schedule an appropriate time for a specific user to access the configurable room.

Figure 35:
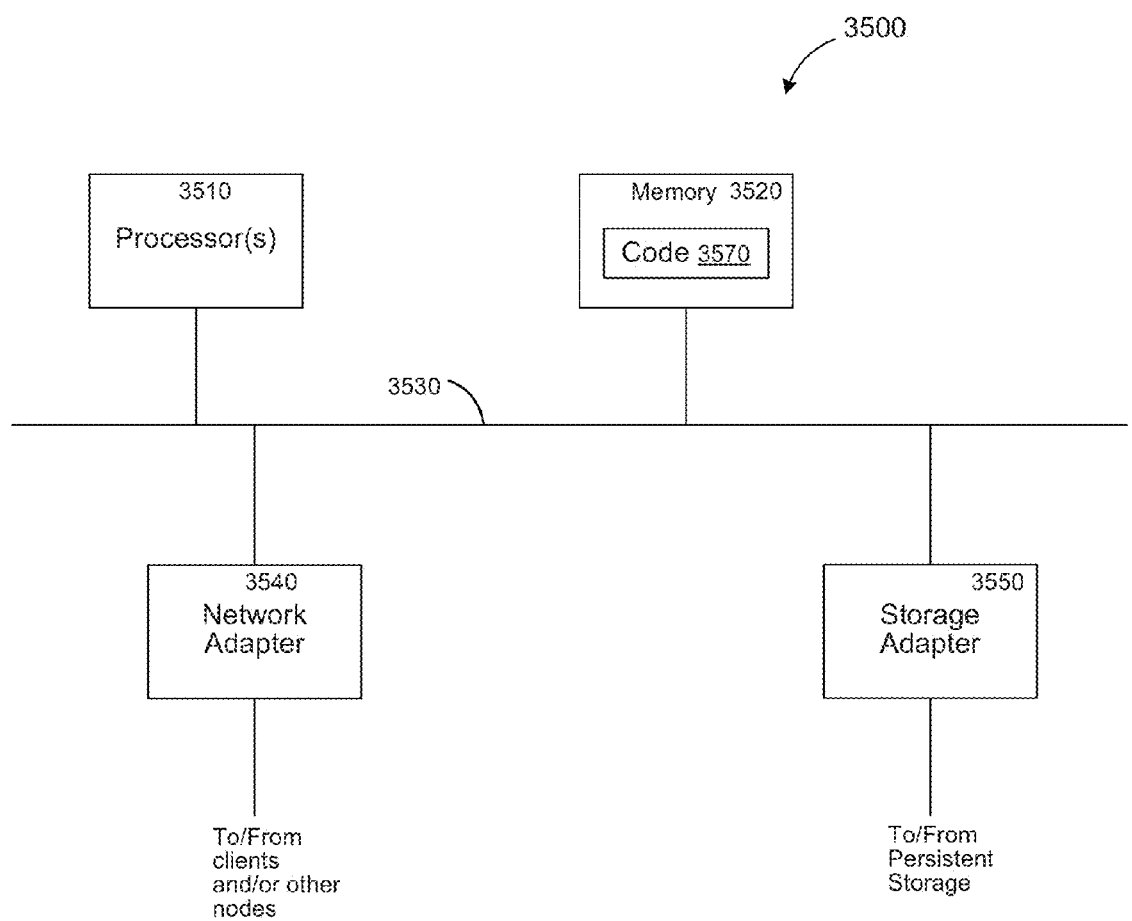
FIG. 35 is a block diagram of an example of a computing device, which may represent one or more computing device or server described herein, in accordance with various embodiments.

FIG. 35 is a block diagram of an example of a computing device 3500, which may represent one or more computing device or server described herein, in accordance with various embodiments. The computing device 3500 can be one or more computing devices that implement the computing machine 3416 of FIG. 34. The computing device 3500 can execute at least part of the method 3100 of FIG. 31, the method 3200 of FIG. 32, and/or the method 3300 of FIG. 33. The computing device 3500 includes one or more processors 3510 and memory 3520 coupled to an interconnect 3530. The interconnect 3530 shown in FIG. 35 is an abstraction that represents any one or more separate physical buses, point-to-point connections, or both connected by appropriate bridges, adapters, or controllers. The interconnect 3530, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 3510 is/are the central processing unit (CPU) of the computing device 3500 and thus controls the overall operation of the computing device 3500. In certain embodiments, the processor(s) 3510 accomplishes this by executing software or firmware stored in memory 3520. The processor(s) 3510 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 3520 is or includes the main memory of the computing device 3500. The memory 3520 represents any form of random access memory (RAM), read-only memory (ROM), flash memory, or the like, or a combination of such devices. In use, the memory 3520 may contain a code 3570 containing instructions according to the mesh connection system disclosed herein.

Also connected to the processor(s) 3510 through the interconnect 3530 are a network adapter 3540 and a storage adapter 3550. The network adapter 3540 provides the computing device 3500 with the ability to communicate with remote devices, over a network and may be, for example, an Ethernet adapter or Fibre Channel adapter. The network adapter 3540 may also provide the computing device 3500 with the ability to communicate with other computers. The storage adapter 3550 enables the computing device 3500 to access a persistent storage, and may be, for example, a Fibre Channel adapter or SCSI adapter.

The code 3570 stored in memory 3520 may be implemented as software and/or firmware to program the processor(s) 3510 to carry out actions described above. In certain embodiments, such software or firmware may be initially provided to the computing device 3500 by downloading it from a remote system through the computing device 3500 (e.g., via network adapter 3540).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; and/or optical storage media; flash memory devices), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

What is claimed is:

1. A computer-implemented method for managing a configurable common room, the method comprising:
    creating a user interface that enables a user to manage the configurable common room;
    presenting the user interface to enable the user to input credentials for a user account;
    authenticating the credentials for the user account, which is permitted to utilize the configurable common room;
    presenting, via the user interface, one or more room usage applications for the configurable common room presently available to the user, each of the one or more room usage applications associated with a different subset of one or more room customization modules;
    receiving, via the user interface, a user selection of a particular room usage application from the one or more room usage applications, the particular room usage application associated with a particular subset of the one or more room customization modules;
    enabling the user to input information indicating the user's selected locations of the particular subset of the one or more room customization modules adapted for the particular room usage application in a layout of the configurable common room;
    reserving the particular subset of the one or more room customization modules for a specified timeframe upon receiving a user confirmation of the user selection;
    automatically, mechanically moving one or more of the particular subset of the one or more room customization modules in the configurable common room;
    unlocking one or more of the particular subset of the one or more room customization modules in the configurable common room;
    enabling the user to access the configurable common room;
    tracking total usage of the configurable common room by the user by monitoring usage of the particular subset of the one or more room customization modules and consumption of utility resources while using the configurable common room; and
    generating a bill that accounts for the total usage of the configurable common room.

2. The computer-implemented method of claim 1, wherein the bill includes a first fee charge based on time window of the usage and a second fee charge based on the utility resources consumed.

3. The computer-implemented method of claim 1, wherein authentication of the user account enables the user to mechanically actuate at least one of the particular subset of the one or more room customization modules.

4. A system for managing a configurable common room comprising:
    a processor; and
    a memory storing instructions, which, when executed by the processor, performs a method comprising:
        creating a user interface that enables a user to manage the configurable common room;
        presenting the user interface to enable the user to input credentials for a user account;
        authenticating the credentials for the user account, which is permitted to utilize the configurable common room;
        presenting, via the user interface, one or more room usage applications for the configurable common room presently available to the user, each of the one or more room usage applications associated with a different subset of one or more room customization modules;
        receiving, via the user interface, a user selection of a particular room usage application from the one or more room usage applications, the particular room usage application associated with a particular subset of the one or more room customization modules;
        enabling the user to input information indicating the user's selected locations of the particular subset of the one or more room customization modules adapted for the particular room usage application in a layout of the configurable common room;
        reserving the particular subset of the one or more room customization modules for a specified timeframe upon receiving a user confirmation of the user selection;
        automatically, mechanically moving one or more of the particular subset of the one or more room customization modules in the configurable common room;
        unlocking one or more of the particular subset of the one or more room customization modules in the configurable common room;
        enabling the user to access the configurable common room;
        tracking total usage of the configurable common room by the user by monitoring usage of the particular subset of the one or more room customization modules and consumption of utility resources while using the configurable common room; and
        generating a bill that accounts for the total usage of the configurable common room.

5. The system of claim 4, wherein the configurable common room further comprises:
    a room structural frame that includes a first predefined space for a first room customization module and a second predefined space for a second room customization module;
    a plurality of coupling-and-release mechanisms permanently fixed to the room structural frame, the plurality of coupling-and-release mechanisms including at least a first release mechanism and a second release mechanism;
    the first room customization module that is detachably connectable to the first predefined space of the room structural frame via the first release mechanism, wherein the first room customization module is configured to present a first room usage utility; and
    the second room customization module that is detachably connectable to the second predefined space of the room structural frame via the second release mechanism, wherein the second room customization module is configured to present a second room usage utility, wherein the first room usage utility is different than the second room usage utility, wherein the first room customization module is adapted with a first user engagement mechanism that enables the first room customization module to be expanded to take up additional space and provide the first room usage utility or contract to reduce space taken up in the configurable common room, and wherein the second room customization module is adapted with a second user engagement mechanism that enables the second room customization module to be expanded to take up additional space and provide the second room usage utility or contract to reduce space taken up in the configurable common room, and wherein the user is able to replace the first room usage utility with a third room usage utility by removing the first room customization module and installing a third room customization module using the first release mechanism.

6. The system of claim 5, wherein the first room customization module includes an appliance, a tool, a configurable fixture, a piece of furniture, or any combination thereof, adapted for the first room usage utility.

7. The system of claim 5, wherein the third room customization module occupies at least a portion of the first predefined space.

8. The system of claim 5, wherein the first release mechanism enables the first room customization module to be uncoupled from the first predefined space independently of the second room customization module being uncoupled from the second predefined space.

9. The system of claim 5, wherein the room structural frame is configured to be detachably coupled to a frame of a modular building.

10. The system of claim 5, further comprising:
a mechanical actuator mechanically coupled to the first room customization module, the second room customization module, or both.

11. The system of claim 10, wherein the mechanical actuator is configured to fold, re-align, re-orient, re-position, resize, or re-configure the first room customization module, the second room customization module, or both.

12. The system of claim 10, further comprising:
a computing machine able to
control the mechanical actuator,
monitor usage of the first room customization module and the second room customization module, and
generate a bill based on the usage of the first room customization module and the second room customization module.

13. The system of claim 12, wherein the computing machine is further configured to generate and present an authentication interface that enables the user to manage access to the configurable common room.

14. The system of claim 12, wherein the computing machine is further configured to create and present a reservation interface that enables the user to schedule an appropriate time for a particular user to access the configurable common room, reserve a new room customization module to replace the first room customization module or the second room customization module, or both.

15. The system of claim 4 further configured to manage a customizable modular building that provides living or working space architecture, the customizable modular building comprising:
a structural frame, wherein the structural frame supports a plurality of unmovable rooms that are permanently coupled to the structural frame and dispersed throughout the customizable modular building;
an anchoring structure permanently fixed to the structural frame,
wherein the anchoring structure includes a mechanical connector that enables a movable common room to be fastened to and unfastened from the structural frame; and
the movable common room,
wherein the movable common room is detachably connectable to the anchoring structure through the use of the mechanical connector,
wherein, by including one or more customization modules, the movable common room is configured for a customized application of use, the one or more customization modules including a fixture, an appliance, a piece of furniture, or some combination thereof that is expandable, collapsible, and adapted for the customized application of use, and
wherein the anchoring structure enables the movable common room to be removed as a single structural unit and replaced by another movable common room.

16. The system of claim 15, wherein the plurality of unmovable rooms comprise a bedroom or an office, and wherein the movable common room is a customizable common room.

17. The system of claim 16, wherein removing the one or more customization modules and installing at least one other customization module causes the customizable common room to be configured for a different customized application of use.

18. The system of claim 15, wherein the one or more customization modules enable the movable common room to be used as a kitchen, a bedroom, a living room, an entertainment room, a bathroom, an office, a patio, a terrace, a gym, a laundry room, a child's playroom, or any combination thereof.

19. The system of claim 15, wherein the mechanical connector is a loop, a hook, a slot, a rail, or some combination thereof configured to mate with a corresponding mechanical connector permanently fixed to the movable common room.

20. The system of claim 15, wherein the mechanical connector is adapted to permit only a subset of a plurality of movable common room types to be fastened to the structural frame.

21. The system of claim 20, wherein the subset of the plurality of movable common room types is composed of movable common rooms configured for a particular customized application of use.

* * * * *